United States Patent
Wada et al.

(10) Patent No.: US 10,131,013 B2
(45) Date of Patent: Nov. 20, 2018

(54) NON-TRANSFERRED PLASMA ARC SYSTEM, CONVERSION ADAPTER KIT, AND NON-TRANSFERRED PLASMA ARC TORCH

(71) Applicant: TAIYO NIPPON SANSO CORPORATION, Tokyo (JP)

(72) Inventors: Katsunori Wada, Kai (JP); Shuhei Kanemaru, Yokohama (JP)

(73) Assignee: Taiyo Nippon Sanso Corporation, Tokyo (JP)

( * ) Notice: Subject to any disclaimer, the term of this patent is extended or adjusted under 35 U.S.C. 154(b) by 51 days.

(21) Appl. No.: 15/126,382

(22) PCT Filed: Mar. 19, 2015

(86) PCT No.: PCT/JP2015/058206
§ 371 (c)(1),
(2) Date: Sep. 15, 2016

(87) PCT Pub. No.: WO2015/141768
PCT Pub. Date: Sep. 24, 2015

(65) Prior Publication Data
US 2017/0087659 A1    Mar. 30, 2017

(30) Foreign Application Priority Data

Mar. 19, 2014    (JP) ................ 2014-056528

(51) Int. Cl.
*B23K 10/00*    (2006.01)
*B23K 10/02*    (2006.01)
(Continued)

(52) U.S. Cl.
CPC .............. *B23K 10/02* (2013.01); *B23K 9/167* (2013.01); *B23K 9/29* (2013.01); *H05H 1/28* (2013.01);
(Continued)

(58) Field of Classification Search
CPC .......... B23K 10/00; B23K 9/167; B23K 9/29; H05H 1/34; H05H 1/28; H05H 1/341; H05H 2001/3447; H05H 2001/3457
(Continued)

(56) References Cited

U.S. PATENT DOCUMENTS

| | | | |
|---|---|---|---|
| 4,803,405 A | 2/1989 | Nakano et al. | |
| 6,025,570 A * | 2/2000 | Fortain | B23K 10/006 219/121.45 |

(Continued)

FOREIGN PATENT DOCUMENTS

| | | |
|---|---|---|
| CA | 2321629 | 4/2001 |
| JP | 49-11743 | 2/1974 |

(Continued)

OTHER PUBLICATIONS

International Search Report for PCT/JP2015/058206 dated Jun. 16, 2015, 2 pages.

(Continued)

*Primary Examiner* — Mark Paschall
(74) *Attorney, Agent, or Firm* — Nixon & Vanderhye P.C.

(57) ABSTRACT

A non-transferred plasma arc system, which is provided with a non-transferred plasma torch (1) that is provided with a non-consumable electrode (101) as a negative electrode and an insert chip as a positive electrode, the insert chip being cooled by a circulated coolant (W) and the insert chip releasing a plasma arc onto a workpiece. The plasma arc torch (1) comprises a TIG welding torch (100) that is provided with the non-consumable electrode (101), whereby an arc is generated between the workpiece and said electrode (101), and a torch nozzle (105), which releases a shield gas toward an arc-generated weld pool of the workpiece. The plasma arc torch (1) is provided with an attachment (51) that is detachably attached to the TIG welding torch (100) while (Continued)

surrounding the periphery of the torch nozzle (105) and that functions as the insert chip, whereby a non-transferred plasma arc is inexpensively and easily used.

14 Claims, 21 Drawing Sheets

(51) Int. Cl.
*B23K 9/29* (2006.01)
*H05H 1/34* (2006.01)
*B23K 9/167* (2006.01)
*H05H 1/28* (2006.01)

(52) U.S. Cl.
CPC .............. *H05H 1/34* (2013.01); *H05H 1/341* (2013.01); *H05H 2001/3447* (2013.01); *H05H 2001/3457* (2013.01)

(58) Field of Classification Search
USPC ........ 219/121.5, 121.51, 121.52, 75, 121.48, 219/121.45
See application file for complete search history.

(56) References Cited

U.S. PATENT DOCUMENTS

| | | | | |
|---|---|---|---|---|
| 9,586,293 | B2* | 3/2017 | Wada | ................... B23K 35/383 |
| 2006/0289406 | A1* | 12/2006 | Helenius | ................. H05H 1/28 |
| | | | | 219/121.48 |
| 2010/0258534 | A1 | 10/2010 | Hughes | |
| 2011/0017712 | A1* | 1/2011 | Wada | ....................... B23K 9/16 |
| | | | | 219/121.46 |
| 2016/0221108 | A1* | 8/2016 | Hoffa | ................... B23K 10/006 |

FOREIGN PATENT DOCUMENTS

| | | |
|---|---|---|
| JP | 55-136567 | 10/1980 |
| JP | 56-126981 | 9/1981 |
| JP | 57-206572 | 12/1982 |
| JP | 62-244574 | 10/1987 |
| JP | 63-194867 | 8/1988 |
| JP | 64-75175 | 3/1989 |
| JP | 01-091971 | 4/1989 |
| JP | 2-70386 | 3/1990 |
| JP | 2001-105148 | 4/2001 |
| JP | 2003-112262 | 4/2003 |
| JP | 2009-233691 | 10/2009 |
| JP | 2013-043181 | 3/2013 |

OTHER PUBLICATIONS

International Search Report issued in PCT/JP2015/084369 dated Mar. 15, 2016.
Notice of Allowance dated Sep. 11, 2018 issued in Japanese Application No. 2014-248013 with English translation (10 pages).

* cited by examiner

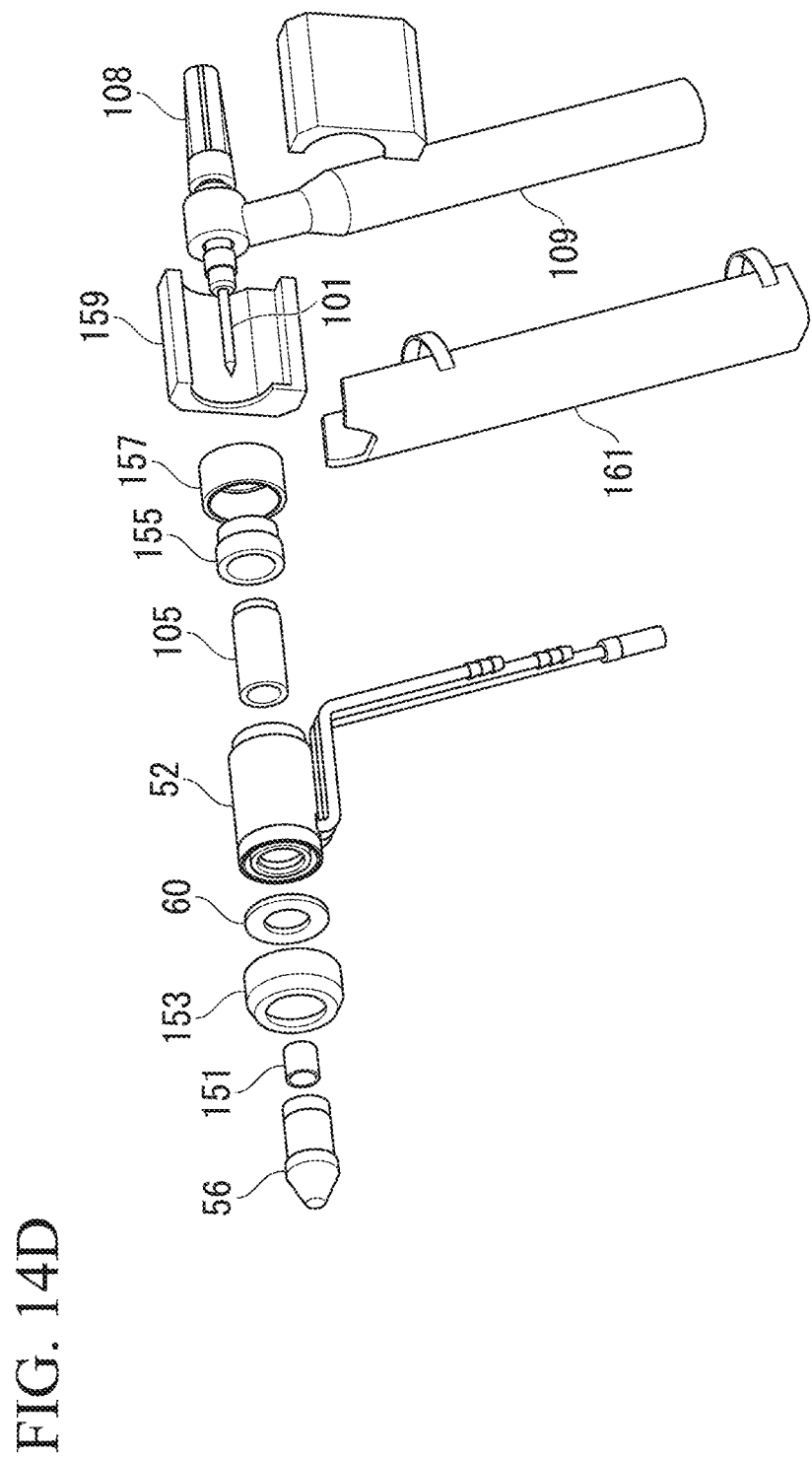

NON-TRANSFERRED PLASMA ARC SYSTEM, CONVERSION ADAPTER KIT, AND NON-TRANSFERRED PLASMA ARC TORCH

TECHNICAL FIELD

The present invention relates to a non-transferred plasma arc system, a conversion adapter kit, and a non-transferred plasma arc torch.

This application is the U.S. national phase of International Application No. PCT/JP2015/058206 filed Mar. 19, 2015 which designated the U.S. and claims priority to Japanese Patent Application No. 2014-056528, filed Mar. 19, 2014, the contents of each of which are incorporated herein by reference.

BACKGROUND ART

A gas shielded arc welding, which is a non-consumable electrode type and is referred to GTAW (Gas Tungsten Arc welding), is conventionally used in welding a structure (workpiece) made of metal and non-ferrous base material. The gas shielded arc welding includes TIG welding (Tungsten Inert Gas welding) or plasma arc welding.

TIG welding is performed while forming a welding pool by melting a workpiece with arc heat which is generated between a non-consumable electrode (−) and the workpiece (+) using a TIG welding torch including a torch nozzle and a non-consumable electrode. Also, during the welding, a shielding gas released from a torch nozzle which surrounds the electrode blocks atmosphere (air).

In contrast, regarding the plasma arc welding, electrically-gerenrated plasma gas (also referred to as working gas) flows between a non-consumable electrode and an insert chip, using a plasma arc torch including the non-consumable electrode, the water-cooled insert chip (also referred to as a constrained nozzle) and a shield cap. A plasma arc with improved energy density is generated by concentrating the generated plasma flow (plasma jet) by using the insert chip, and then using wall effect (effect of stabilizing the flow of the air flow of the plasma flow) due to the inner wall of the shape of the insert chip and thermal pinch effect (effect of becoming a high temperature due to constriction by cooling the surroundings of the plasma flow) obtained by cooling the insert chip. The plasma arc is further narrowed down by receiving the thermal pinch effect of shielding gas emitted from the shield cap.

The plasma arc welding has high energy density and is performed using a plasma arc, which has a narrowed cylindrical arc shape, as a heat source. In addition, the plasma arc has a transferred type and a non-transferred type. The transferred plasma arc can only be applied to a conductive workpiece becase electric current flows between the non-consumable electrode (−) and the workpiece (+). On the other hand, the non-transferred plasma arc can be used even for non-conductive workpiece applications because electric current flows between the non-consumable electrode (−) and the insert chip (+). Furthermore, the plasma arc is not limited to welding applications described above, for example, it is also used for brazing, joint, cutting, thermal-spraying, melting furnace or the like, against the workpiece.

The plasma arc torch and the power unit for the plasma arc system are generally more expensive than the torch and power unit for TIG welding system. On the other hand, a torch used in both TIG welding torch and plasma arc torch by replacing the spare parts attached to the plasma arc torch body, has been proposed (e.g., see Patent Document 1).

However, in the technique described in Patent Document 1, it is necessary to provide different replaceable parts if being used as a TIG welding torch or as a plasma arc torch. Further, a relatively expensive power unit is used for the plasma arc.

Conventionally, as a non-consumable electrode welding process of welding a workpiece (base material), TIG welding or a plasma welding method is used. Since the heat concentration is excellent, it is possible to perform the welding process at a high welding speed and to obtain a result with a narrow bead width and a small distortion, when the plasma welding method is used, compared with the TIG welding method.

The plasma welding method is a plasma arc method (transferred type plasma), a plasma jet method (non-transferred type plasma), or the like.

In general, a welding system used with the plasma arc method (welding machine of the plasma arc system) includes a torch; a main power unit in which a negative terminal is connected to an electrode constituting the torch, and a positive terminal is electrically connected to a workpiece; a pilot arc power unit which is electrically connected to a main power unit via a wire; a change-over switch which includes wires for connecting the pilot arc power unit with a insert chip (also referred to as "restraint nozzle") which constitutes the torch; and a high-frequency device for generating a pilot arc.

When using a plasma welding system of the plasma arc system, it is possible to perform relatively deeper-penetration welding.

When using a plasma jet type plasma welding system (plasma jet type plasma welding machine), an electrode constituting a torch is connected to a negative terminal of a main power unit, a insert chip constituting the torch is connected to the main power unit at a positive terminal.

In the plasma jet method, since no current flows through the workpiece, it can also be used as a heat source for thermal spraying or a heat source of furnace.

A complex type plasma welding system disclosed in Patent Document 2 includes a torch, a power unit (hereinafter, referred to as "plasma power unit for a complex system"). The plasma power unit for the complex system includes a main arc power unit (also referred to as "main power unit"), a pilot arc power unit, and a high frequency device.

A negative terminal of the main arc power unit (main power unit) is connected to an electrode which constitutes a torch, and a positve terminal is electrically connected to a workpiece. The pilot arc power unit is electrically connected to the main arc power unit and an insert chip.

When the plasma welding system of complex mode above is used, since it is possible to obtain stable plasma even at very low current, it is possible to weld an ultra thin sheet which is difficult to be welded by using the TIG welding method.

By the way, the power unit (hereinafter referred to as "TIG power unit") constituting the TIG welding system (TIG welding machine) uses a welding power unit and a high-frequency device, which is a very simple structure.

Thus, as compared with the TIG power unit, since the plasma power unit is expensive, it is a factor of increasing the cost of the plasma welding system.

For this reason, even if the plasma welding system has a better welding performance, there is a problem that it is difficult to adopt a plasma welding system in which it is possible to obtain deep penetration, due to the disadvantage that the initial investment cost is high.

[Patent Document 1] Japanese Utility Model Publication No. 1981-126981

[Patent Document 2] Japanese Patent Publication No.1988-194867

SUMMARY OF THE INVENTION

The first embodiment of the present invention, which has been proposed in view of the conventional circumstances, provides a non-transferred plasma arc system which uses a non-transferred plasma arc inexpensively and readily available, as well as, in the non-transferred plasma arc system, a conversion adapter kit converting the TIG welding torch to a non-transferred plasma arc and a non-transferred plasma arc torch including a conversion adapter kit.

Further, the second embodiment of the present invention provides a plasma welding system and plasma welding method in which it is possible to obtain deeper penetration welding while suppressing the initial investment.

To achieve the above objects, the first embodiment of the present invention provides the following means.

(1) A non-transferred plasma arc system comprising a non-transferred plasma arc torch and a power unit for supplying power and gas to the non-transferred plasma arc, wherein the plasma arc torch comprises a non-consumable electrode and an insert chip, wherein the insert chip is provided as an anode for emitting a plasma arc to the workpiece while the insert chip is cooled by circulation of coolant, the plasma arc torch includes:

a TIG welding torch comprising the non-consumable electrode which generates an arc between a workpiece and the non-consumable electrode, and a torch nozzle which releases a shielding gas toward the molten pool of the workpiece caused by the arc, and an attachment which functions as the insert chip and is provided so as to be freely attachable and detachable to and from the TIG welding torch in a state that the attachment surrounds the periphery of the torch nozzle.

(2) The non-transferred plasma arc system according to (1), wherein the plasma arc torch further comprises a shield cap which releases shielding gas from the outside of the plasma arc and is provided so as to be attached to the attachment in an insulating state and in a state surrounding the periphery of the attachment.

(3) The non-transferred plasma arc system according to claim (1) or (2), wherein the attachment comprises a power supply nozzle surrounding the distal end of the torch nozzle, and the plasma arc torch switchs between two states by moving the non-consumable electrode in the axial direction, wherein one state is a state in which the the tip of the non-consumable electrode is withdrawn inside from the distal end of the power supply nozzle and another state is a state in which the tip of the non-consumable electrode protrudes outside the distal end of the power supply nozzle.

(4) The non-transferred plasma arc system according to claim (1) or (2), wherein the attachment comprises a power supply nozzle which is movably supported in the axial direction in a state of surrounding the periphery of the distal end of the torch nozzle, and the plasma arc torch switchs between two states by moving the non-consumable electrode in the axial direction, wherein one state is a state that the the tip of the non-consumable electrode is withdrawn inside from the distal end of the power supply nozzle and another state is a state that the tip of the non-consumable electrode protrudes outside the distal end of the power supply nozzle.

(5) The non-transferred plasma arc system according to any one of (1) to (4), wherein the power unit uses a power unit for TIG welding.

(6) The non-transferred plasma arc system according to any one of (1) to (5), wherein the power unit includes a switching device for switching the supply of the electric power according to the case of using the TIG welding torch or using the plasma arc torch.

(7) The non-transferred plasma arc system according to (6), wherein it is possible to weld by only using the plasma arc torch or to weld only by using the TIG welding torch.

(8) The non-transferred plasma arc system according to claim (6), wherein the power unit comprises at least two power units for plasma arc torch and a power unit for TIG welding torch. The power unit may be used in (15) to (23) of the second embodiment of the present invention.

(9) The non-transferred plasma arc system according to any one of (1) to (8), further includes a cooling device for circulating a coolant flowing through the attachment, wherein the cooling device is connected to the plasma arc torch.

(10) A conversion adapter kit converting a TIG welding torch to a non-transferred plasma arc torch, wherein the TIG welding torch comprises a non-consumable electrode which generates an arc between a workpiece and the non-consumable electrod and a torch nozzle which releases a shielding gas toward the molten pool of the workpiece caused by the arc, the non-transferred plasma arc torch comprises a non-consumable electrode as a cathode and an insert chip as an anode, wherein the insert chip is provided for emitting a plasma arc to the workpiece while the insert chip is cooled by circulation of a coolant, and the conversion adapter kit comprises an attachment which functions as the insert chip and is provided so as to be freely attachable and detachable to and from the TIG welding torch in a state that the attachment surrounds the periphery of the torch nozzle.

(11) The conversion adapter kit according to (10), further includes a shield cap which releases shielding gas from the outside of the plasma arc and is provided so as to be attached to the attachment in a insulating state and in a state surrounding the periphery of the attachment.

(12) The conversion adapter kit according to (10) or (11), wherein the attachment comprises a power supply nozzle surrounding the distal end of the torch nozzle.

(13) A non-transferred plasma arc torch, including a TIG welding torch and a conversion adapter kit according to any one of (10) to (12), wherein the TIG welding torch comprises a non-consumable electrode which generates an arc between a workpiece and the non-consumable electrode, and a torch nozzle which releases a shielding gas toward the molten pool of the workpiece caused by the arc.

(14) The non-transferred plasma arc torch according to claim (13), wherein the non-transferred plasma arc torch is used by connecting a power unit for TIG welding.

In order to solve the above problems, the second embodiment of the present invention provides the following welding system and plasma welding method.

(15) A welding system includes a plasma welding torch and a power unit, wherein the plasma welding torch includes an electrode; an insert chip provided so as to surround the outer periphery of the electrode; a center gas supply passage provided between the electrode and the insert chip, in which a center gas is supplied; a shield cap provided so as to surround the outer periphery of the insert chip; an outer gas supply passage provided between the shield cap and the insert chip, in which an outer gas is supplied, and wherein the power unit includes a first welding power unit which is a welding power unit for TIG welding system, in which a positive terminal is electrically connected to the insert chip, and a negative terminal is electrically connected to the electrode; and a second welding power unit which is a welding power unit used for a TIG welding system, in which a positive terminal is electrically connected to a workpiece, and a negative terminal is electrically connected to the electrode.

(16) The welding system according to (15), wherein the first welding power unit includes a high frequency device or a high-voltage device, and the second welding power unit supplies a current only during the first welding power unit supplies the welding current, and the second welding power unit includes a high-frequency device or a high-voltage device.

(17) The welding system according to (15) or (16), the first and second welding power unit are the same types of welding power unit.

(18) The welding system according to (15) or (16), the first and second welding power unit are different types of welding power unit.

(19) The welding system according to any one of (15) to (18), the insert chip induces a cooling water flow path for flowing cooling water for cooling the electrode.

(20) A plasma welding method includes a plasma jet arc generation step of generating a non-transferred type plasma jet arc between an electrode and an insert chip; and a welding step of welding the workpiece by the non-transferred type plasma jet arc genereated between the workpiece and the electrode, wherein in the plasma jet arc generation step, a current is supplied from the first welding power unit which is a welding power unit for TIG welding system, the positive terminal is electrically connected to the insert chip of th plasma welding torch and the negative terminal is electrically connected to the electrode of the plasma welding torch; and in the welding step, a current is supplied from the second welding power unit which is a welding power unit for TIG welding system, the positive terminal is electrically connected to the workpiece and the negative terminal is electrically connected to the electrode.

(21) A plasma welding method includes a plasma jet arc generation step of generating a non-transferred type plasma jet arc between an electrode and an insert chip; and a welding step of welding the workpiece by the non-transferred type plasma jet arc genereated between the workpiece and the electrode, wherein in the plasma jet arc generation step, a current is supplied from a first welding power unit which is a welding power unit for TIG welding system, a positive terminal is electrically connected to the insert chip of the plasma welding torch and a negative terminal is electrically connected to the electrode of the plasma welding torch; and in the welding step, a current is supplied from a second welding power unit which is a welding power unit for TIG welding system, a positive terminal is electrically connected to the workpiece and a negative terminal is electrically connected to the electrode, and a high-frequency start method by using a high-frequency device constituting the second welding power unit is used, or a high-voltage start method by using a high voltage devices constituting the second welding power unit in place of the high-frequency device is used.

(22) The plasma welding method according to (20) or (21), in the welding welding step, in a state that generation of plasma jet arc is continued, welding workpiece is performed.

(23) The plasma welding method according to any one of (20) to (22), the plasma jet arc is generated by supply a current in a range of 4A to 500A by the first welding power unit.

As described above, according to the first embodiment of the present invention, a non-transferred plasma arc system in which it is possible to use a non-transferred plasma arc inexpensively and readily; a conversion adapter kit which can converts a TIG welding torch to a non-transferred plasma arc in the non-transferred plasma arc system; and a non-transferred plasma arc torch including the conversion adapter kit are provided.

Further, according to the second embodiment of the present invention, after suppressing the initial investment in the welding system, it is possible to obtain a welding result which has a deep penetration.

BRIEF DESCRIPTION OF THE DRAWINGS

FIG. 14D is an exploded view showing the various components of the plasma arc torch.

DETAILED DESCRIPTION OF THE INVENTION

Hereinafter, as the first embodiment of the present invention, a non-transferred plasma arc system, a conversion adapter kit, and a non-transferred plasma arc torch will be described in detail with reference to the accompanying drawings.

(Non-Transferred Plasma Arc Torch and Conversion Adapter Kit)

First, an example of the application of the the first embodiment of the present invention, a non-transferred plasma arc torch and a conversion adapter kit are described.

As an example of the application of the the first embodiment of the present invention, a plasma arc torch includes a portion repurposing a TIG welding torch, and is a non-transferred plasma arc torch converted from the TIG welding torch by using a conversion adapter kit of the present invention. Therefore, the plasma arc torch of the present invention can use a general-purpose TIG welding torch which is conventionally used, and so it is possible to be used by connecting a power unit for TIG welding.

Figure 1A:
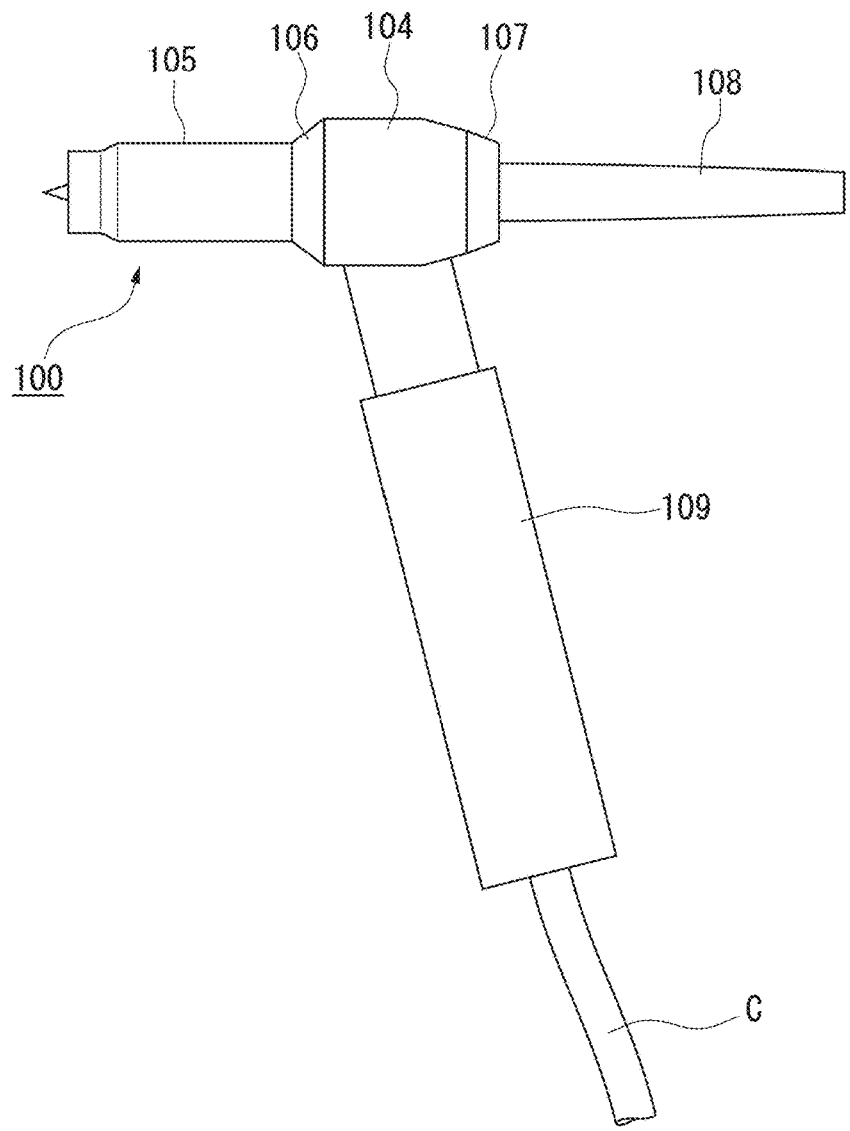
FIG. 1A is a side view of an example for a TIG welding torch.
Figure 1B:
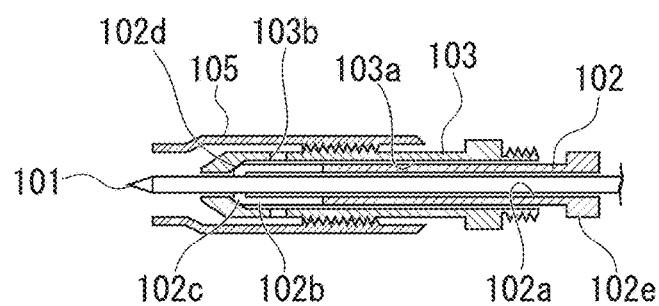
FIG. 1B is an example cross-sectional view of the essential part for the TIG welding torch.

Specifically, first, a TIG welding torch 100 as shown in FIGS. 1A and 1B will be described.

Incidentally, FIG. 1A is a side view of the TIG welding torch 100, and FIG. 1B is a cross-sectional view of main portion of the TIG welding torch 100.

The TIG welding torch 100, as shown in FIGS. 1A and 1B, includes a non-consumable electrode 101 as a cathode; a collet 102 supporting the non-consumable electrode 101 in a state of being inserted inside; a collet body 103 holding the collet 102 on the inside in a state that the non-consumable electrode 101 protrudes from the distal end side of the collet body 103; a torch body 104 attached on the collet body 103; a torch nozzle 105 for emitting shield gas, which is attached to the collet body 103 in the state of surrounding periphery of the non-consumable electrode 101; a front gasket 106 provided between the torch body 104 and the torch nozzle 105; a torch cap 108 provided in a state that placing a rear gasket 107 between the torch body 104 and the torch cap 108; and a handle 109 for the user to grasp, which is mounted to the torch body 104.

The non-consumable electrode 101 is made of, for example, elongated electrode bars made from a high melting point metal material such as tungsten. The tip of the non-consumable electrode 101 is in a state projecting outward from the tip of the torch nozzle 105.

The collet 102 is made of, for example, a substantially cylindrical member made from a metal material having excellent electrical conductivity and thermal conductivity, such as copper or copper alloy. The collet 102 has a through-hole 102a that penetrates in the axial direction, to slidably support the through hole 102a wherein the non-consumable electrode 101 is inserted into the inner side of the through hole 102a in the axial direction. Further, on the distal end side of the collet 102, a plurality of slits 102b are provided side by side in the circumferential direction. The plurality of slits 102b are cut in a straight line across the front end of the collet 102 in the middle portion in the axial direction. Accordingly, the tip portion 102c between the slits 102b is elastically deformable in diameter direction.

Further, in the distal end portion of the collet 102, a tapered portion 102d, which is gradually reduced in diameter, is provided. On the other hand, in the base end portion of the collet 102, an enlarged diameter portion 102e, which is enlarged than the periphery thereof, is provided.

The collet body 103 is composed of a substantially cylindrical member made from a material excellent in electrical conductivity and thermal conductivity such as copper or copper alloy. The collet body 103 has a through-hole 103a penetrating in the axial direction and holds the collet 102 inserted from the base end side of the through hole 103a on the inside. The through-hole 103a of the collet body 103 forms a flow path of shielding gas supplied from the torch body 104. Both of the tip portion of the collet body 103 and the through hole 103a are progressively reduced in diameter so that, from the distal end portion of the through hole 103a, it is possible to project the non-consumable electrode 101 only. In addition, in the front end side of the collet body 103, a plurality of jet holes 103b for ejecting shielding gas are provided side by side in the circumferential direction. Then, the collet body 103 is mounted detachably in the torch body 104 by screwing the base end side of the collet body 103.

The torch body 104 includes a body bracket (not shown) made from metallic material with lower conductivity and thermal conductivity than those of the collet 102 and the collet body 103 described above, for example, steel such as mild steel or stainless steel, brass or the like may be used. This body bracket is coated by an insulating resin.

The body bracket includes a power unit for supplying power to the non-consumable electrode 101 through the collet body 103 and collet 102, and a flow path formed inside the body bracket and toward the collet body 103 for supplying shielding gas.

At one end portion (tip side), having a substantially cylindrical shape, of the body bracket, a collet body 103 is detachably attached by screwing; and at an opposite side (rear end side), the torch cap 108 is detachably attached by screwing. Further, the body bracket includes a connecting portion at the distal end of the extended portion schematic tubular downward from the middle portion of the cylindrical portion, and a first feed cable $C_1$ is detachably attached to the connecting portion.

The first feed cable $C_1$ is a so-called air-cooled feed cable. On the inside of the feed cables $C_1$, for example, a feed cable for supplying electric power to the main body (power unit), and a gas hose for supplying the gas containing shielding gas or below-metioned plasma gas to the main bracket (flow path) is provided.

The torch nozzle 105 is provided for performing the rectification of the shielding gas ejected from the ejection hole 103b of the collet body 103. The torch nozzle 105 is made from ceramic with excellent heat resistance in a substantially cylindrical shape, and has a nozzle shape in which the tip end side is gradually reduced in diameter. Then, the torch nozzle 105 can be mounted detachably to the outer peripheral portion of the collet body 103 by screwing. In addition, the front gasket 106 is mounted in a state of being sandwiched between the torch nozzle 105 and the torch body 104.

A torch cap 108 is provided for sealing the rear end of the torch body 104 together with the rear gasket 107, and the torch cap 108, having a cap-like shape, is provided for accommodating the rear end side the non-consumable electrode 101 thereinside. In addition, the torch cap 108 is removably attached by screwing, or the like, to the body bracket of the torch body 104. Further, when the torch cap 108 is attached to the torch body 104, the torch cap 108 presses the collet 102 in the direction toward the distal end while abutting the base end of the collet 102. At this time, the front end face (tapered portion 102d) of the collet 102 which is inserted into the through hole 103a of the collet body 103 is pressed against the front end surface of the through hole 103a, and as a result, the tip portion 102c of the collet 102 is elastically deform in the direction of narrowing the diameter thereof. Accordingly, the non-consumable electrode 101 is held by the tip portion 102c of the collet 102, and the non-consumable electrode 101 can be fixed in collet 102. Further, after the non-consumable electrode 101 slides along the collet 102 in the axial direction, the fixing operation is performed by the torch cap 108, and as a result, it is possible to adjust the amount of projection of the non-consumable electrode 101 from the tip of the torch nozzle 105.

The handle 109, which is a portion for a user to grasp, for example, having roughly pipe shape, is attached to the extended portion of the torch body 104. Then, the first feed cable $C_1$ is connectable to the connection portion of the torch body 104 through the inner of the handle 109.

By using the TIG welding torch 100 having the above structure, the welding is performed by generating an arc between the non-consumable electrode 101 and the workpiece, while the shielding gas from the tip of the torch nozzle 105, such as a mixed gas obtained by adding hydrogen (H2) in argon (Ar), or a mixed gas obtained by adding helium (He) in argon (Ar), is released.

Figure 2A:
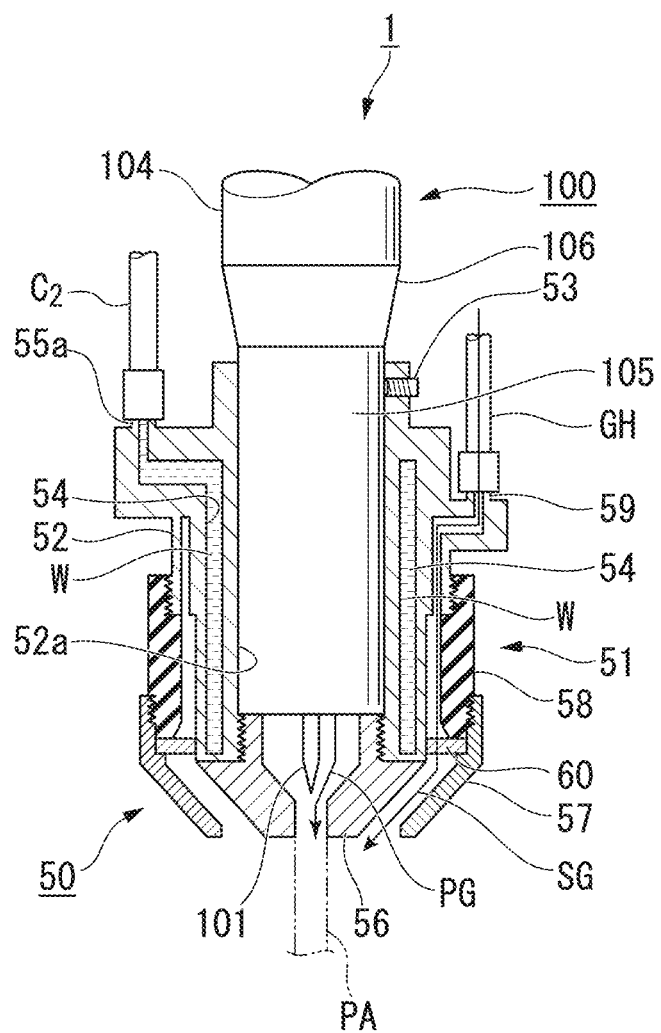
FIG. 2A is a view showing an example of a non-transferred plasma arc torch and a conversion adapter kit, and it shows a state in which the TIG welding torch, as shown in FIGS. 1A and 1B, is mounted in the conversion adapter kit.
Figure 2B:
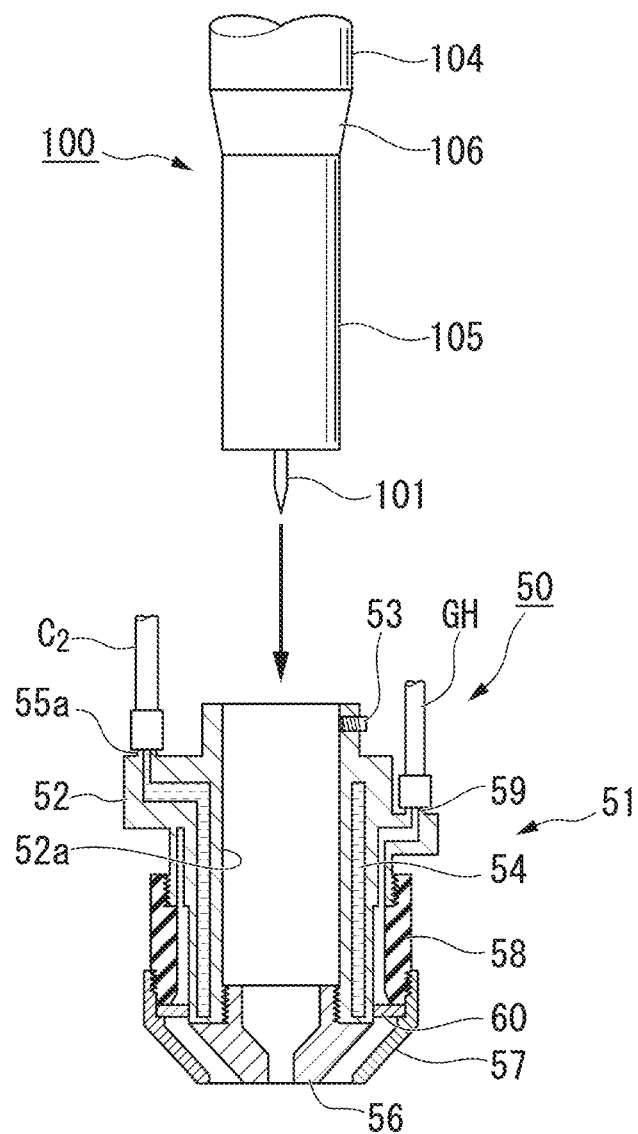
FIG. 2B is a view showing an example of a non-transferred plasma arc torch and a conversion adapter kit, and it shows a state in which the TIG welding torch, as shown in FIGS. 1A and 1B, was removed from the conversion adapter kit.

Next, a non-transferred plasma arc torch 1 of the present invention as shown in FIGS. 2A, 2B, and a conversion adapter kit 50 as shown in FIGS. 3A to 3D will be described.

Incidentally, FIG. 2A shows an enlarged view of the main part of the non-transferred plasma arc torch 1, which is a conversion adapter kit 50 in which the TIG welding torch 100 is attached. FIG. 2B shows the conversion adapter kit 50 in which the TIG welding torch 100 is removed from the conversion adapter kit.

Figure 3A:
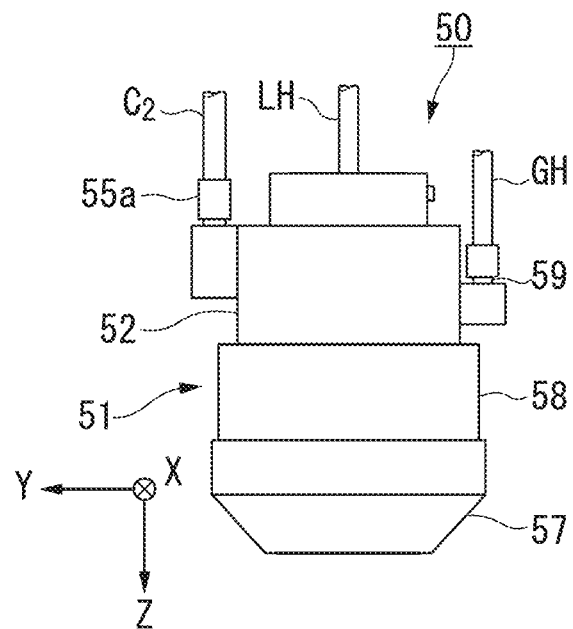
FIG. 3A is a view showing an example of a conversion adapter kit, which is seen from one side in the X-axis direction.
Figure 3B:
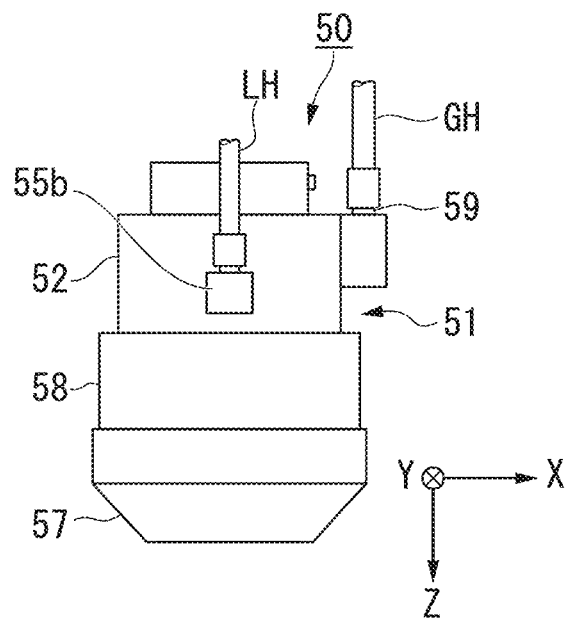
FIG. 3B is a view showing an example of a conversion adapter kit, which is seen from one side of the Y-axis direction.
Figure 3C:
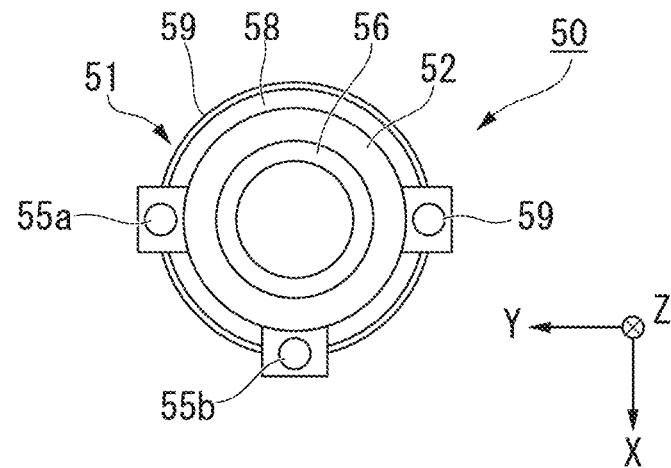
FIG. 3C is a view showing an example of a conversion adapter kit, which is seen from one side in the Z-axis direction.
Figure 3D:
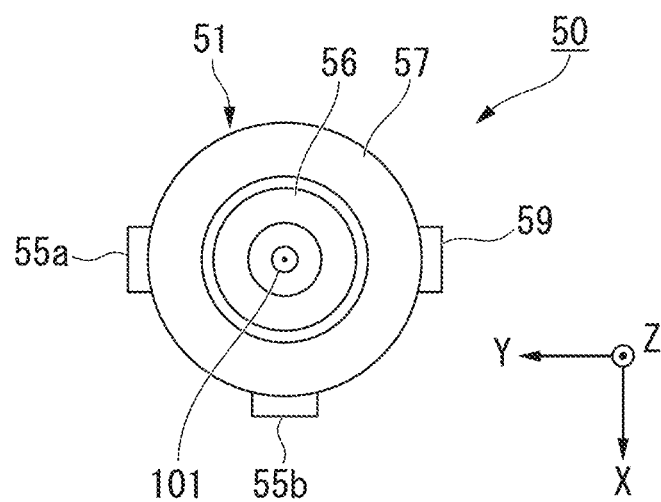
FIG. 3D is a view showing an example of a conversion adapter kit, which is seen from the other side of the Z-axis direction.

FIGS. 3A to 3D are block diagrams of the conversion adapter kit 50, FIG. 3A shows a view of the conversion adapter kit 50 seen from one side in the X-axis direction, FIG. 3B is a view of the conversion adapter kit seen from one side of the Y-axis direction. FIG. 3C is a view of the conversion adapter kit seen from one side in the Z-axis direction (base end side). FIG. 3D is a view of conversion adapter kit seen from the other side of the Z-axis direction (distal end side).

As shown in FIGS. 2A, 2B and FIGS.3A to 3D, the conversion adapter kit 50 is provided for converting the TIG welding torch 100 to the non-transferred plasma arc torch by mounting the TIG welding torch 100 in the conversion adapter kit 50. Specifically, the conversion adapter kit 50 includes an attachment 51 which is detachably attached to the TIG welding torch 100 and surrounds the periphery of the torch nozzle 105.

The attachment 51 functions as an insert chip with a water cooling which releases plasma arc PA to the workpiece while the attachment 51 is cooled by the circulation of cooling water W (coolant). Specifically, the attachment 51 includes a main body portion 52 made from conductive metal material in a substantially cylindrical shape. The main body portion 52 has a through hole 52a penetrating in the axial direction and is fixed is fixed to the outer periphery of the torch nozzle 105 by using a fixing means such as fixing screws 53, in a state of inserting the torch nozzle 105 from the base end side of the through hole 52a. Alternatively, without using the fixing means such as fixing screws 53, the main body portion 52 may be fixed to the outer peripheral portion of the torch nozzle 105 by fitting the main body portion 52 with the outer peripheral portion of the torch nozzle 105.

Inside the main body portion 52, a water jacket (water channel) 54 in which the cooling water W flows is provided. In the outer peripheral portion of the main body portion 52, an entry-side connecting portion 55a for supplying the cooling water W in the water jacket 54, and the exit-side connecting portion 55b for discharging the cooling water W from the water jacket 54 are provided.

The attachment 51 makes it possible to detachably connect the second feed cable $C_2$ to the body portion 52. The second feed cable $C_2$ is a so-called water-cooled feed cable, and for example, a feed cable for supplying electrical power to the main body portion 52 and a cooling hose for cooling water (coolant) which is circulated inside the main body 52 are provided inside the second feed cable $C_2$.

In the distal end of the main body portion 52, the power supply nozzle 56 is provided surrounding the distal end of the torch nozzle 105. The power supply nozzle 56 is made from, for example, a conductive metal material in a substantially cylindrical shape, and the distal end portion has a narrowed shape toward the outside. The power supply nozzle 56 is attached by screwing the inner peripheral surface of the main body portion 52 in a state of inserting the base end side to the inside of the through hole 52a. Further, the torch nozzle 105, when it is inserted inside the through hole 52a, is positioned by abutting the base end of the power supply nozzle 56. The tip of the non-consumable electrode 101 is in a state of being withdrawn inside the distal end of the power supply nozzle 56.

On the attachment 51, a shield cap 57 is mounted via an insulating cap (insulating portion) 58. In order to not be affected by the heat as the main body portion 52 and the power supply nozzle 56, the shield cap 57 is made from, for example, metal material such as stainless steel in a substantially shape of a cylinder with a distal end portion inwardly being narrowed. The shield cap 57 is attached by screwing the outer peripheral portion of the insulating cap 58 in a state surrounding the periphery of the attachment 51. The insulating cap 58 is made of a substantially cylindrical member made from an insulating material. The insulating cap 58 is attached to the outer peripheral portion of the main body portion 52 by screwing. Thereby, the shield cap 57 is mounted in a state of being insulated with respect to the attachment 51 by using the insulating cap 58.

Inside the main body portion 52, a flow path in which shielding gas SG flows is formed. Further, on the inner side of the shield cap 57 and the insulating cap 58, a flow path in which shielding gas SG flows are formed. In the outer peripheral portion of the main body portion 52, a connecting portion 59 for supplying the shielding gas SG is provided. The attachment 51 makes it possible to detachably connect a gas hose GH for supplying a shielding gas SG to the connection portion 59.

Between the main body portion 52 and the shield cap 57, a gas lens (rectifier) 60 for rectifying the shielding gas SG emitted from the shield cap 57 is provided. The gas lens 60 made of a metal mesh member in a ring shape is held inside the shield cap 57 in a state of being inserted into the body portion 52. The gas lens 60 is not always necessary, and it is also possible to omit the gas lens 60 in some cases.

In the plasma arc torch 1 having the structure as described above, while emitting a plasma gas (working gas) PG from the tip of the torch nozzle 105, an plasma gas PG generated electrically flows between the non-consumable electrode 101 as a cathode (−) and attachment (insert chip) 51 as an anode (+). The plasma flow (the plasma jet) generated at this time is narrowed by the power supply nozzle 56, and then a plasma arc PA which energy density is increased is generated by using wall effect due to the inner wall shape of the power supply nozzle 56 and a thermal pinch effect obtained by cooling the main body portion 52. Further, the plasma arc PA is further narrowed by using the thermal pinch effect of the shielding gas SG emitted from the shield cap 57.

As the plasma gas PG and shielding gas SG, the present invention is not particularly limited, for example, an inert gas such as argon (Ar) or helium (He) and a mixed gas obtained by adding hydrogen ($H_2$) to argon (Ar) and a mixed gas obtained by adding helium (He) to argon (Ar) may be used. Furthermore, it is possible to use a mixed gas obtained by adding nitrogen ($N_2$) to an inert gas, or a flammable gas. As the shielding gas SG, for example, carbon dioxide ($CO_2$), a mixed gas obtained by adding oxidizing gas such as oxygen ($O_2$) or carbon dioxide ($CO_2$) to an inert gas, and a flammable gas may be used.

Thus, the plasma arc welding using the plasma arc torch 1 has high energy density, and is performed by using a plasma arc PA narrowed down to a cylindrical shape as a heat source.

As described above, in the present embodiment, by attaching the conversion adapter kit 50 to the TIG welding torch 100, it is possible to easily convert the TIG welding torch 100 to the plasma arc torch 1. Further, by using the plasma arc torch 1, it is possible to use the non-transferred plasma arc inexpensively and easily.

Regarding the above-mentioned conversion adapter kit 50, it is not limited to the structure of the attachment 51 in which a metallic shield cap 57 is attached to the main body portion 52 via an insulating cap 58 as described above. For example, it is also possible to omit the insulating cap 58 and directly mount the metallic shield cap 57 to the body portion 52. Further, it is also possible to omit the insulating cap 58 and directly attach the shield cap 57 made of an insulating material such as ceramic to the main body 52. Also, the whole of the attachment 51 is formed as an insulating structure by using a heat resistant rubber or a heat-resistant resin (provided that threaded portion is excluded), by applying a coating, or by applying a ceramic thermal-spraying process.

(Non-Transferred Plasma Arc System)

Next, an example of a non-transferred plasma arc system of the the first embodiment of the present invention will be described.

Figure 4:
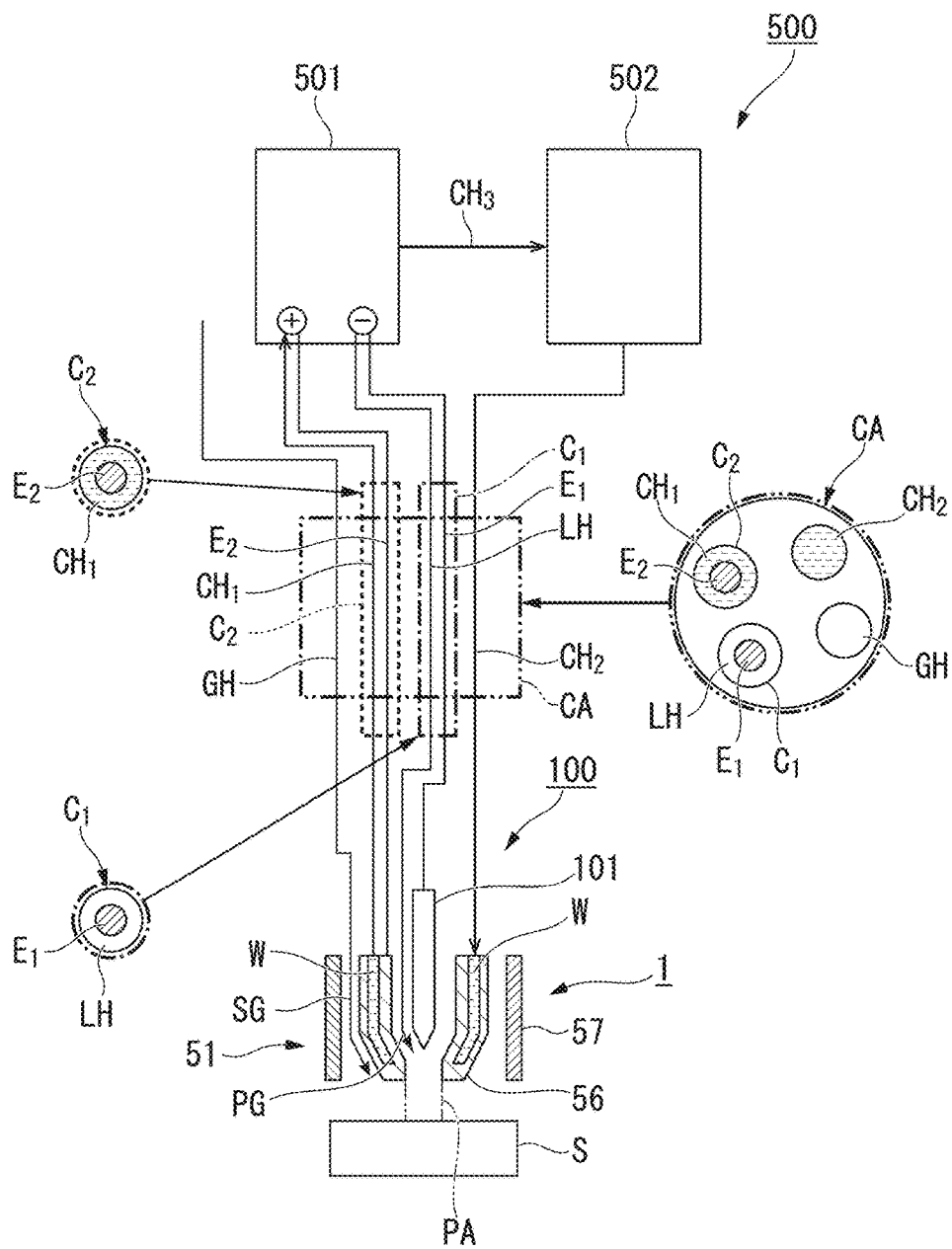
FIG. 4 is a schematic diagram showing an example of the configuration of a non-transferred plasma arc system.

FIG. 4 is a schematic view showing the non-transferred plasma arc system 500 of the the first embodiment of the present invention.

The plasma arc system 500 includes, as shown in FIG. 4, the above plasma arc torch 1; a power unit 501, connected with the plasma arc torch 1, for supplying electric power, as well as a plasma gas PG and shielding gas SG; a cooling device 502, connected with the plasma arc torch 1, for circulating the cooling water W flowing in the attachment (insert chip) 51.

In the plasma arc system 500, the power unit 501 uses a TIG welding power. That is, in the plasma arc system 500 of the present embodiment, not only the TIG welding torch 100 but also the TIG welding power unit can be used. As the power unit 501, it is not limited to use the power unit for the TIG welding, and a plasma arc power unit may also be used. As the cooling device 502, it is not limited in particular, it is possible to use known materials conventionally.

In the plasma arc system 500, the non-consumable electrode 101 is electrically connected to a negative terminal (−) of the power unit 501 via a feed cable $E_1$ in the first feed cables $C_1$. Further, the attachment 51 is electrically connected to a positive terminal (+) of the power unit 501 via a feed cable $E_2$ in the second feed cable $C_2$.

In the plasma arc system 500, it is possible to supply the plasma gas PG via a liner LH in the air-cooled feed cable in $C_1$ to the plasma arc torch 1. Further, it is possible to supply the shielding gas SG via a hose GH to the plasma arc torch 1.

In the plasma arc system 500, a cooling hose $CH_1$ in the second feed cable $C_2$ connected to the power unit 501 is connected to the entry side connection portion 55a (not shown in FIG. 4). Further, a cooling hose $CH_2$ connected to the cooling device 502 is connected to the exit-side connecting portion 56a (not shown in FIG. 4). A cooling hose $CH_3$ is provided for connecting the power unit 501 and the cooling device 502. Then, in the plasma arc system 500, it is possible to perform cooling while circulating the cooling water W between the attachment 51 (the main body portion 52) and the cooling device 502 via these cooling hoses $CH_1$, $CH_2$, $CH_3$ there.

The plasma arc system 500 uses a collective cable assemblying the first feed cable $C_1$, the second feed cable $C_2$, the gas hose GH, and the cooling hose $CH_2$. Incidentally, as the cables and hoses for use in the plasma arc system 500, it is not necessarily limited to the above-described structures, and it may be added or modified appropriately.

The plasma arc system 500 having the structure as described above makes it possible to use non-transferred plasma arc inexpensive and easily by using the plasma arc torch 1 to which the TIG welding torch 100 is converted by attaching the conversion adapter kit 50, and a power unit 501 repurposing the TIG welding power unit.

The first embodiment of the present invention is not intended to be limited to the above embodiments and can be variously modified without departing from the scope of the present invention.

Figure 5:
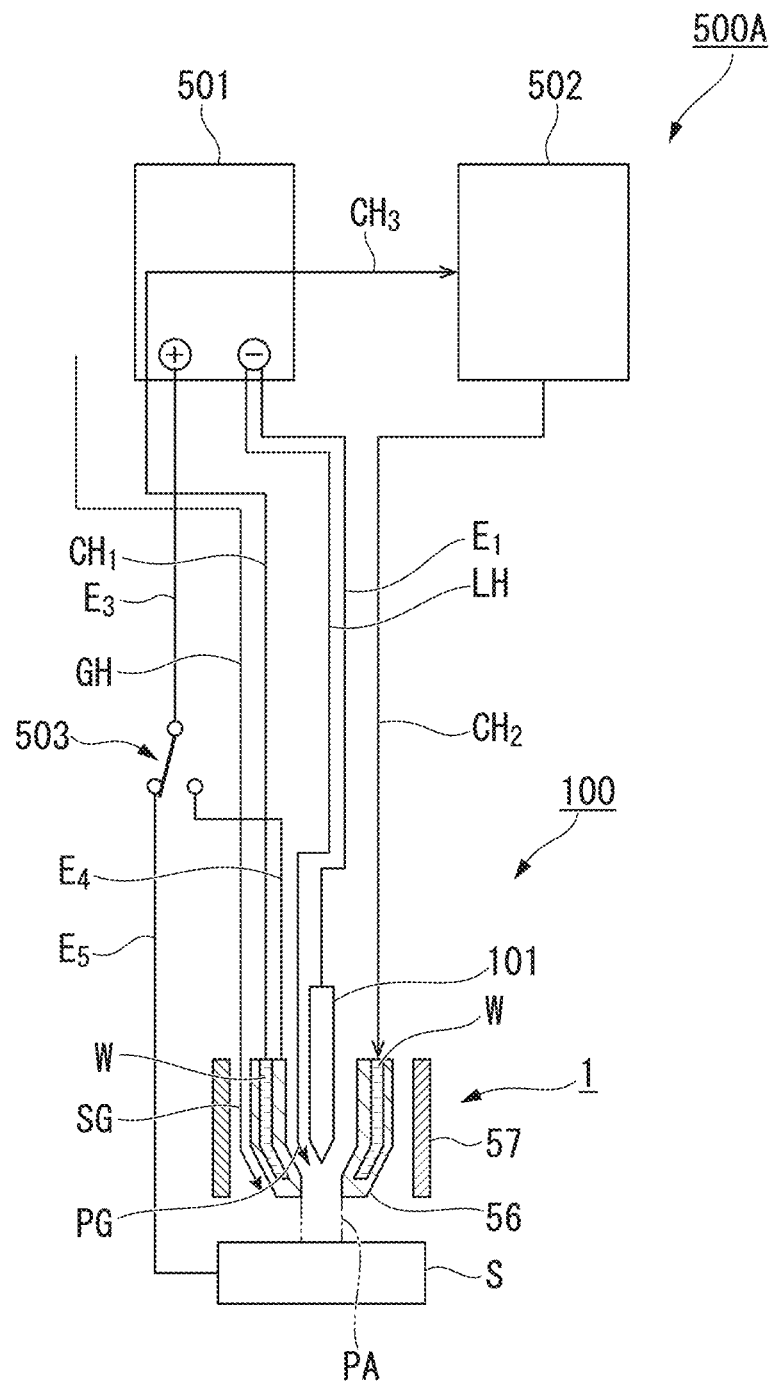
FIG. 5 is a schematic diagram showing another example of the configuration of the plasma arc system.

For example, a plasma arc system 500A as shown in FIG. 5, may include a switching device 503 for switching the supply of electrical power between the case of using the plasma arc torch 1 and the case of using the TIG welding torch 100.

Specifically, the switching device 503 is provided among a first feed cable E3 electrically connected to the positive terminal (+) of power unit 501; a second feed cable E4 electrically connected to the attachment 51; a third feed cable E5 electrically connected to the workpiece S. And the switching device 503 can switch the connections of the contacts between the first feed cable E3 and the second feed cable E4, and the contact between the first feed cable E3 and the third feed cable E5.

That is, when using the non-transferred plasma arc torch 1, the switching device 503 is switched so as to connect the attachment 51 with the positive terminal (+) of the power unit 501 via the first feed cable E3 and the second feed cable E4. On the other hand, when using the TIG welding torch 100, the switching device 503 is switched so as to connect the workpiece S with the positive terminal (+) of the power unit 501 via the first feed cable E3 and the third feed cable E5.

Thus, it is possible to switch the power unit 501 easily between the case of using the non-transferred plasma arc torch 1 and the case of using the TIG welding torch 100.

Figure 6:
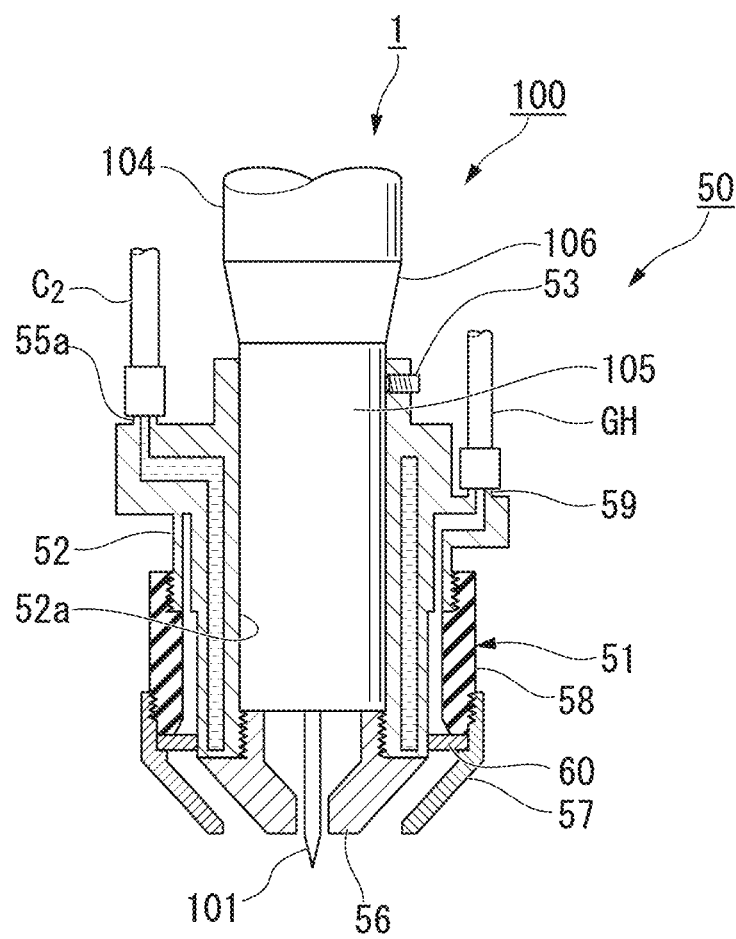
FIG. 6 is a view showing a state in which the TIG welding torch, as shown in FIGS. 1A and 1B, was attached in conversion adapter kit, in the case the plasma arc torch is used as a TIG welding torch having double nozzle structure.
Figure 7:
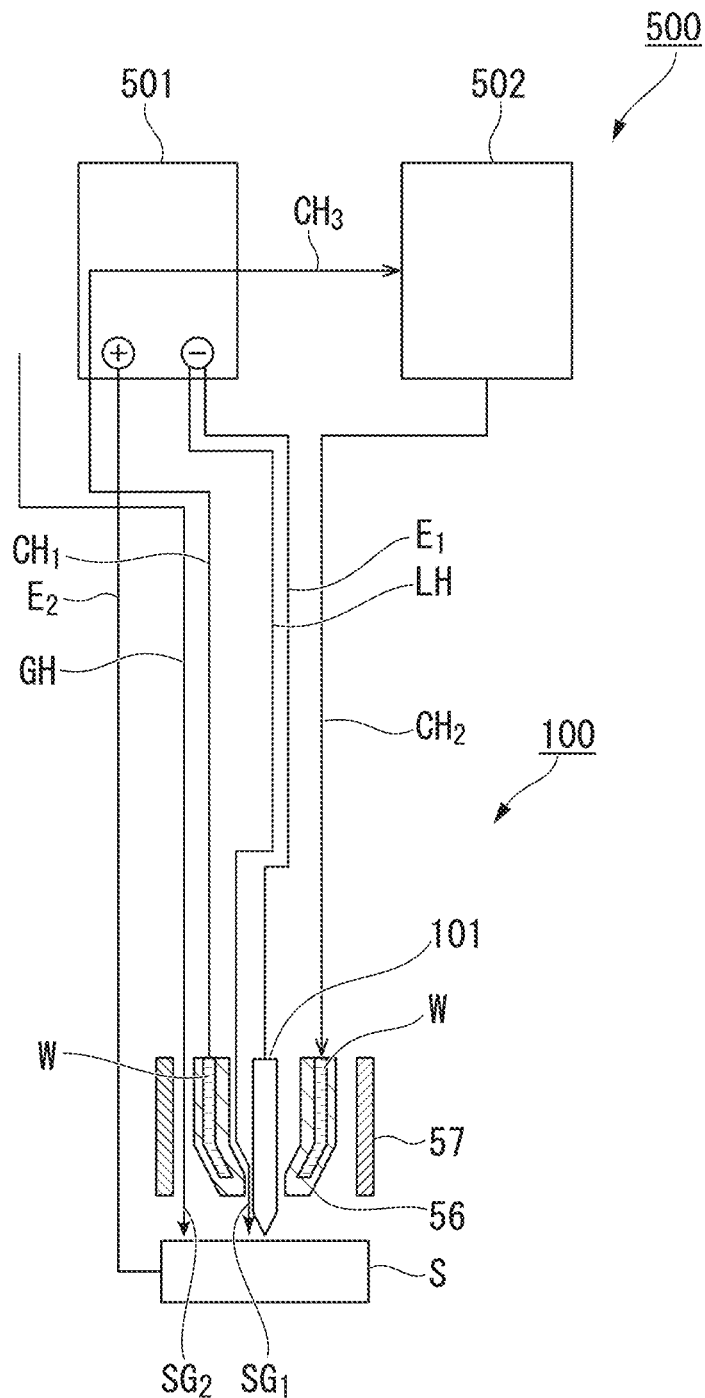
FIG. 7 is a schematic diagram showing an example of a configuration of a plasma arc system, in the case the plasma arc torch is used as a TIG welding torch having a double nozzle structure.

Further, the plasma arc torch 1, as shown in FIGS. 6 and 7, it is also possible to be used as a TIG welding torch having the double nozzle structure. In this case, the workpiece S is electrically connected with the positive terminal (+) of the power unit 501 via the first feed cable E3 and third feed cable E5. In addition, in the above-mentioned plasma arc torch 1, the state that the tip of the above-mentioned non-consumable electrode 101 is withdrawn inside the tip of the power supply nozzle 56 is changed to the state that the tip of the non-consumable electrode 101 projects outward from the tip of the power supply nozzle 56. Thus, it is possible to use the above the plasma arc torch 1 as the TIG welding torch having the double nozzle structure. When it is used as a TIG welding torch having a double nozzle structure, instead of the plasma gas PG, the first shield gas SG1 is released from the power supply nozzle (referred to as the inner nozzle.) 56, and the second shield gas SG2 is released from the shield cap (called outer nozzle.) 57.

That, the conversion adapter kit 50 has a function of converting the TIG welding torch 100 to the TIG welding torch of the double nozzle structure by attaching it to the TIG welding torch 100. On the other hand, by removing the conversion adapter kit 50 from the plasma arc torch 1, the plasma arc torch 1 can be readily converted to the TIG welding torch 100.

As the power unit 501, in the case of using the TIG welding power unit, it is possible to apply the function of the TIG welding power unit to the plasma arc. For example, the TIG welding power unit uses a DC pulse control having frequency in the range of 0.1 to 500 Hz. The DC pulse control is suitable to be used for controlling arc heat. Further, The TIG welding power unit uses an AC frequency control having a frequency in the range of 30 to 400 Hz. The AC frequency control is suitable for applications requiring cleaning action. Further, the TIG welding power unit uses a control combining the AC frequency control and the DC pulse control having a frequency in the range of 0.1 to 20 Hz. The control has effects of reducing the exhaustion of the non-consumable electrode 101.

Figure 8A:
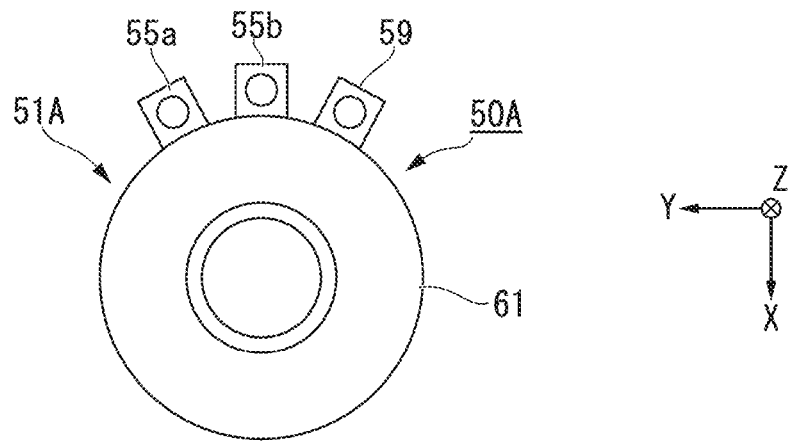
FIG. 8A is a view showing another example of a conversion adapter kit, which is seen seen from one side in the Z-axis direction.
Figure 8B:
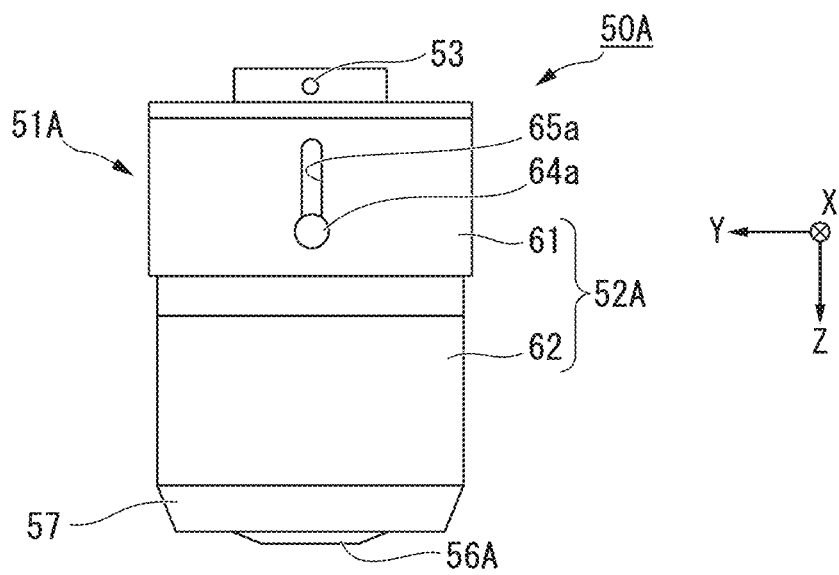
FIG. 8B is a view showing another example of a conversion adapter kit, which is seen from one side of the X-axis direction (base end side).
Figure 8C:
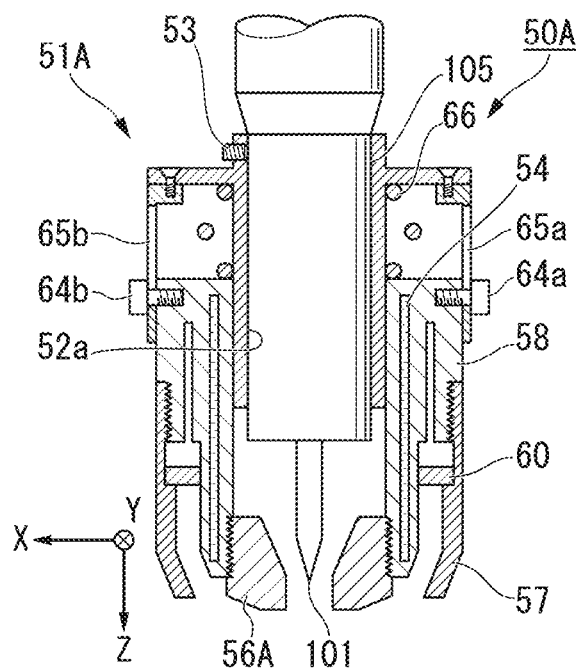
FIG. 8C is a view showing another example of a conversion adapter kit, which is a cross-sectional view showing a state in which the tip of the non-consumable electrode is withdrawn.
Figure 8D:
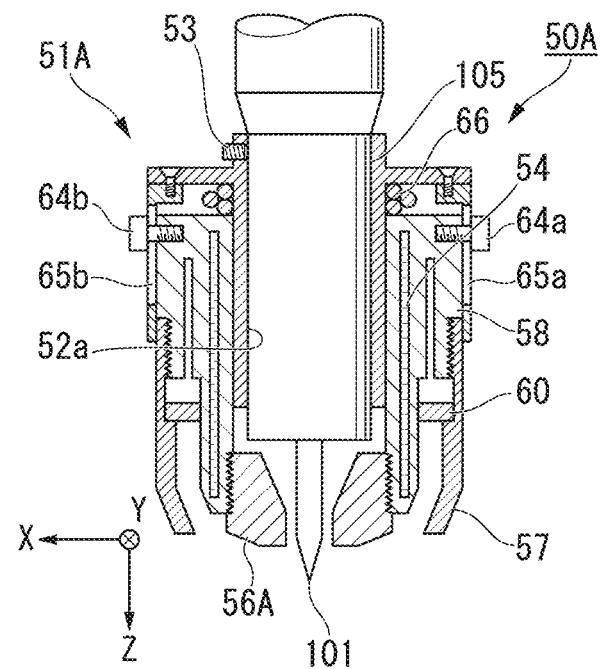
FIG. 8D is a view showing another example of a conversion adapter kit, which is cross-sectional view showing a state in which the tip of the non-consumable electrode protrudes.

Further, for example, as shown in FIGS. 8A to 8D, the conversion adapter kit 50A may include an attachment 51A which is provided so that the power supply nozzle 56A is supported to be movable in the axial direction relative to the main body portion 52A. Incidentally, FIG. 8A shows a view of the conversion adapter kit 50A seen from one side of the Z-axis direction, FIG. 8B shows a view of the conversion adapter kit 50A seen from one side of the X-axis direction (base end side), FIG. 8C shows a cross-sectional view of the adapter kit 50A in a state in which the tip of the non-consumable electrode 101 is withdrawn, and FIG. 8D shows a cross-sectional view of the adapter kit 50A in a state in which the tip of the non-consumable electrode 101 protrudes. In the following description, the same portions as the conversion adapter kit 50 described above will not be described, and the same reference numerals are used.

Specifically, in this attachment 51A, the main body portion 52A is divided into two portions of a fixed portion 61 and a movable portion 62. Among them, the fixed portion 61 includes the through hole 52a described above. On the other hand, the movable portion 62 includes the water jacket (waterway) 54 described above, the entry side connecting portion 55a, the exit-side connecting portion 55b, the power supply nozzle 56A, the shield cap 57, the insulating cap 58, the connection portion 59 and the gas lens 60.

The fixed portion 61 is fixed to the outer peripheral portion of the torch nozzle 105 using a fixing means such as fixing screws 53 in a state that the torch nozzle 105 is inserted from the base end side of the through hole 52a. Further, the fixed portion 61 includes a storage recess 63 for accommodating the movable portion 62, a pair of guide slits 65a and 65b for guiding the pair of guide screw 64a and 64b which is attached to the outer peripheral surface of the movable portion 62.

The movable portion 62 is housed inside the housing recess 63a in a state that a pair of the guide screw 64a and 64b is engaged on the inner side of 65a and 65b. Also, the compression coil spring 66, which presses again the movable portion 62 toward the distal end side, is housed inside the housing recess 63

Thereby, in the attachment 51A, the movable portion 62 moves in the axial direction relative to the fixed portion 61 while a pair of guide screws 64a and 64b inside a pair of guide slits 65a and 65b relatively moves (slides). Further, in the attachment 51A, it is possible to push the movable portion 62 on the inner side of the housing recess 63 against the bias of the compression coil spring 66. Furthermore, in the attachment MA, by tightening the guide screws 64a and 64b, it is possible to fix the moving part 62 to the fixed portion 61.

In the plasma arc torch 1 attached with the conversion adapter kit 50A, it can be switched between the state that the tip of non-consumable electrode 101 is withdrawn on the inside than the tip of the power supply nozzle 56A as shown in FIG. 8C, and the state that the tip of the non-consumable electrode 101 protrudes outward from the tip of the power supply nozzle 56A as shown in FIG. 8D, by moving the movable portion 62 including a power supply nozzle 56A in the axial direction relative to the fixed portion 61.

Thus, in the state that the the tip of the non-consumable electrode 101 is withdrawn inside the tip of the power supply nozzle 56A, it is possible to perform the welding or the like in which the plasma arc is used as a heat source. On the other hand, in a state that the tip of the non-consumable electrode 101 projects outward from the tip of the power supply nozzle 56, the plasma arc torch 1 can be converted to the TIG welding torch having double nozzle structure.

Application of the plasma arc is not limited to the welding described above, and for example, it is possible to widely use brazing against the workpiece; bonding a metal, a resin, or glass; cut as an alternative to the gas burner; surface treatment such as thermal spraying or surface modification treatment; a heat source such as a melting furnace, or other heat sources and plasma generation source.

In the above embodiment, by using the conversion adapter kits 50 and 50A, it has been described that the TIG welding torch 100 is converted to the non-transferred plasma arc torch 1. However, the non-transferred plasma arc torch 1 may be used as a transferred plasma arc torch in which a current flows between the cathode (−) of the non-consumable electrode and the anode (+) of the workpiece.

Figure 14A:
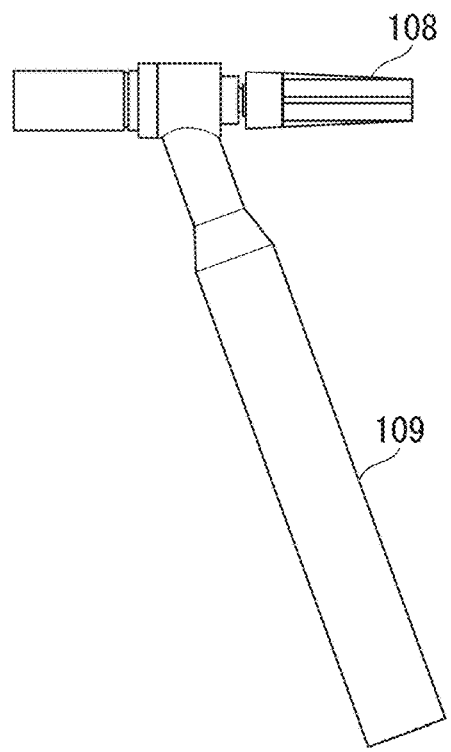
FIG. 14A is a diagram showing a general-purpose TIG torch constituting the plasma arc torch.
Figure 14B:
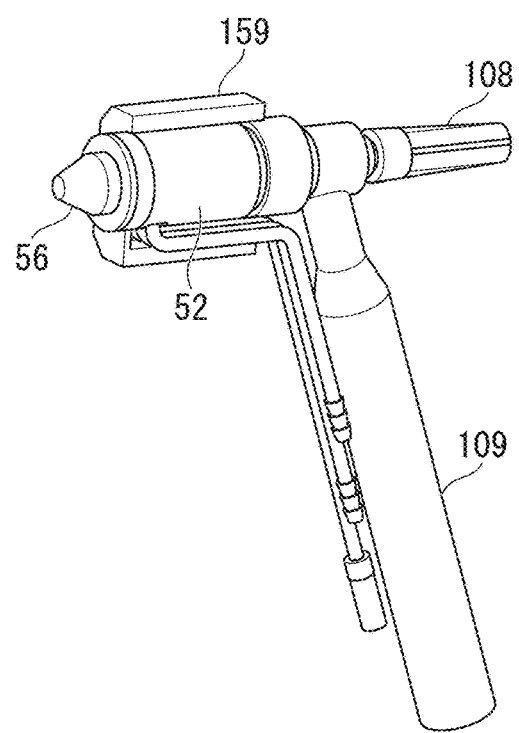
FIG. 14B is a diagram showing the assembled state of plasma arc torch without cover.
Figure 14C:
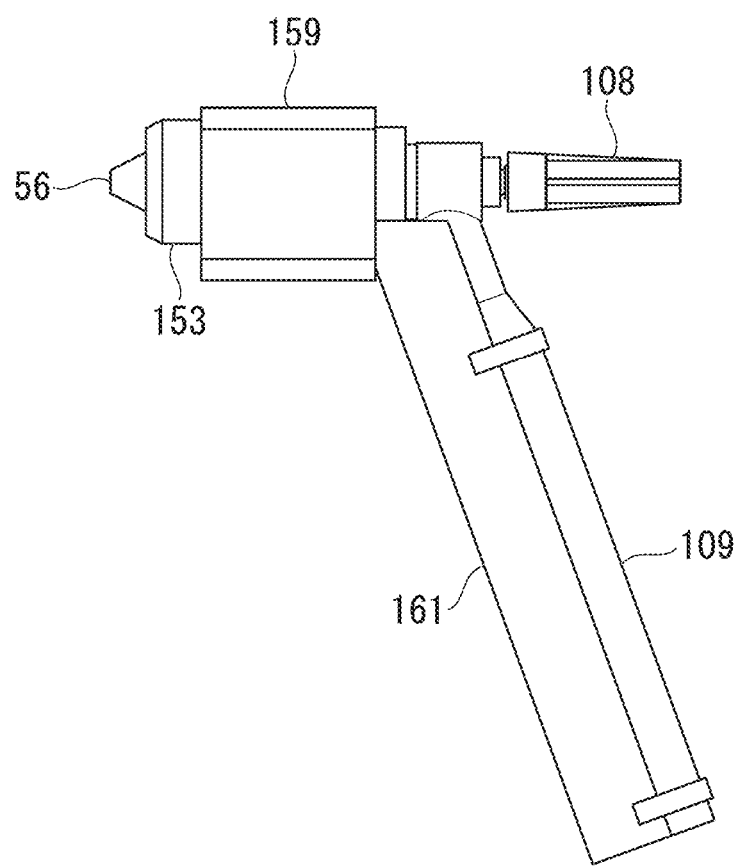
FIG. 14C is a diagram showing the assembled state of plasma arc torch with a cover.

Further, the plasma arc torch 1, as shown in FIGS. 14A to 14D, includes each component shown in generic TIG torch (FIG. 14A) and exploded view (FIG. 14D) (Completion drawing 1 (FIG. 14B) or Completion drawing 2 (FIG. 14C)). Completion drawing 1 shows an assembly state diagram without the cover (FIG. 14B). Completion drawing 2 shows an assembly state diagram with a cover (FIG. 14C).

In the exploded view of FIG. 14D, the electrode center correction ceramic 151 is a guide to introduce the non-consumable electrode 101 to the center with an insulating state. The nozzle 153 is an outside shield nozzle installed in the main body tip. The insulator 155 is a part provided for shielding gas leaking. The attachment fixing ring 157 is a ring that connects the main body portion 52 and the insulator 155. The body insulation cover 159 is a cover for insulating the main body portion 52, and the cover 161 is a cover for covering the handle 109.

Hereinafter, the embodiments of the second embodiment of the invention with reference to accompanying drawings will be described in detail. Incidentally, the drawings used in the following description is for explaining the configuration of the second embodiment of the present invention, and size, thickness, and dimensions of each part shown may have different dimension from those of actual welding system.

(Embodiment)

Figure 15:
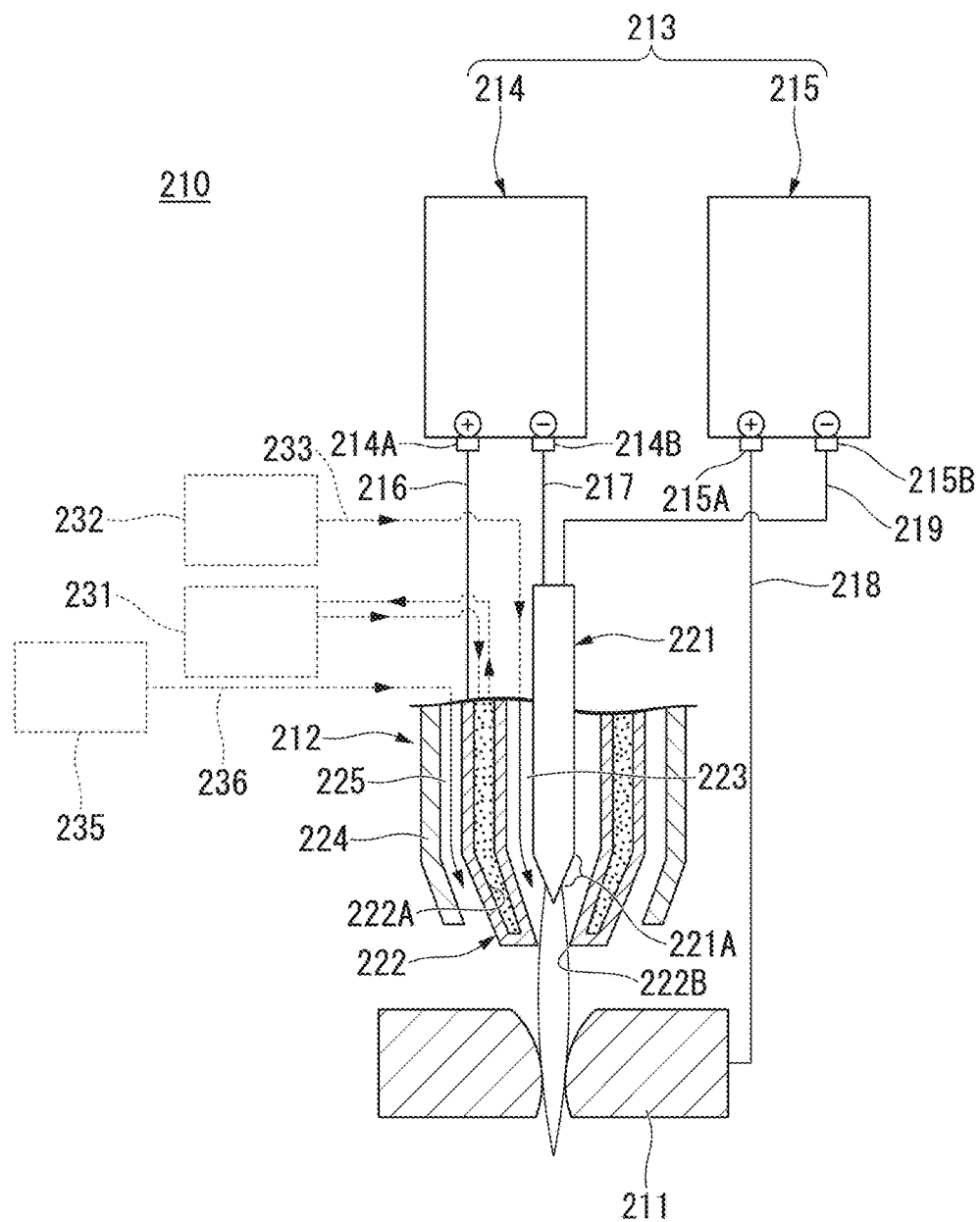
FIG. 15 is a diagram showing a schematic configuration of a welding system according to the second embodiment of the present invention.

FIG. 15 is a view showing a schematic configuration of a welding system according to the second embodiment of the present invention. In FIG. 15, for convenience of explanation, cross-sections of insert chip 222 and the shield cap 224 of a plasma welding torch 212 are used. Further, in FIG. 15, a structure other than the components of the welding system 210 is illustrated in dotted lines.

Referring to FIG. 15, the welding system 210 of this embodiment includes a plasma welding torch 212, a power unit 213, and wires 216-219.

The plasma welding torch 212 has an electrode 221, an insert chip 222, a passage for supplying center gas 223, a shield cap 224, and the outer gas supply passage 225.

The electrode 221 is a non-consumable electrode extending in one direction and has tip 221A with a sharpened shape. The distal end portion 221A is completely housed in the insert chip 222. The electrode 221 is made from a high melting point metal material.

As the material of the electrode 221, for example, tungsten or tungsten in which an oxide (e.g., thorium oxide, lanthanum oxide, cerium oxide, yttrium oxide, zirconium oxide, etc.) is added.

The insert chip 222 is a tubular member which is provided so as to surround the outer periphery of the electrode 221 and to provide gap between the electrode 221 (in other words, the supplying center gas passage 223 can be formed).

The insert chip 222 has a cooling water flow path 222A having cooling water therein. The cooling water flow path 222A supplies the cooling water in the cooling water flow path 222A to cool the electrode 221 and is connected to the cooling water circulation unit 231 for collecting the cooling water that has contributed to the cooling of the electrode 221.

The shape of the tip of the insert chip 222 has a reduced diameter shape in the direction from the base end to the tip end of the insert chip 222.

The tip of the insert chip 222 includes a hole 222B from which the plasma arc generated in the electrode 221 is ejected outside the insert chip 222.

Since the plasma arc generated in the electrode 221 has a wall effect and a thermal pinch effect due to the insert chip 222, it is focused to become a high energy density arc, and to be ejected from the insert chip hole 222B.

The passage for supplying center gas 223 is a substantially cylindrical space defined by the outer surface of the insert chip 222 and the inner surface of the electrode 221. The passage for supplying center gas 223 is connected to a center gas supply source 232 via the center gas feed line 233.

When the center gas is supplied from the center gas supply source 232 to the passage for supplying center gas 223, the center gas is supplied to the tip portion 221A of the electrode 221. As the center gas, for example, it is possible to use an inert gas such as argon gas.

Although not shown in FIG. 15, in the center gas feed line 233, a flow meter measuring a flow rate of the center gas and a flow rate adjusting valve for adjusting the flow rate of the center gas may be provided.

The shield cap 224 is a tubular member surround the outer periphery of the insert chip 222, and the shield cap 224 is provided so that a gap is interposed between the insert chip 222 and the shield cap 224 (in other words, an outer gas supply passage 225 can be formed). The distal end portion of the shield cap 224 has a reduced diameter shape.

The outer gas feed passage 225 is a substantially cylindrical space defined by the the outer surface of the insert chip 222 and the inner surface of the shield cap 224. The outer gas feed passage 225 is connected to an outer gas source 235 via the outer gas supply line 236.

If the outer gas is supplied from the outer gas supply source 235 to the outer gas supply passage 225, the outer gas is supplied to the tip end of the plasma welding torch 212.

Examples of the outer gas may be, for example, an inert gas alone, such as argon gas or helium gas, a mixed gas obtained by mixing the argon gas and hydrogen gas, a mixed gas obtained by mixing the argon gas and helium gas, a mixed gas obtained by mixing argon gas, helium and a hydrogen gas, a mixed gas obtained by mixing an argon gas and an oxidizing gas such as oxygen and carbon dioxide, a mixed gas obtained by mixing nitrogen and an inert gas such as argon or helium.

Although it is not shown in FIG. 15, the outer gas supply line 236 may include a flow meter for measuring a flow rate of the outer gas and a flow rate adjusting valve for adjusting the flow rate of the outer gas.

The power unit 213 includes a first welding power unit 214 and a second welding power unit 215 which is a power unit for supplying a welding current, wherein the power unit 213 includes the second welding power unit 215 only when the welding current is supplied from the first welding power unit 214.

The first welding power unit 214 includes a high-frequency device or a high-voltage device. The second welding power unit 215 includes a high-frequency device or a high-voltage device.

The power unit 213 may include a first welding power unit 214 having a high frequency device and a second welding power unit 215 having a high frequency device. That is, the first and second welding power units 214 and 215 may use the same type welding power units.

In this case, as the first and second welding power units 214 and 215, it is possible to use the same type welding power units. Thus, since it is possible to use a common part, it is easy to manage the standby power units when the first and second welding power units 214 and 215 break down.

Further, when the first and second welding power units 214 and 215 use the same type welding power unit, since the operation method of the welding power units are the same, the erroneous operation of the first and second welding power units 214 and 215 can be suppressed.

The power unit 213 may include the first welding power unit 214 having a high-voltage device and a second welding power unit 215 having a high-voltage device. That is, the first and second welding power units 214 and 215 may use the same type welding power unit.

In this case, the first and second welding power units 214 and 215 have the same effect as the case when using high-frequency devices.

Further, the power unit 213 may include a first welding power unit 214 having a high-frequency device and a second welding power unit 215 having a high-voltage device, or, alternatively, may include a first welding power unit 214 having a high-voltage device and a second welding power unit 215 having a high-frequency device. That is, the first and second welding power units 214 and 215 may use different types of welding power units.

As explained above, the power unit 213 includes a first welding power unit 214 and a second welding power unit 215 which is a power unit for supplying a welding current, wherein the power unit 213 includes the second welding power unit 215 only when the welding current is supplied from the first welding power unit 214.

On the other hand, a high-frequency devices constituting the conventional plasma power unit has a structure having a high-frequency device or a high-voltage device which is used only for pilot arc generation.

That is, in the conventional plasma welding power unit, a pilot arc is generated by the pilot arc power unit and the high-frequency device, and a main arc is transferred between the electrode and the base material by lead of the pilot arc.

Therefore, in the conventional plasma power unit, a high-frequency device is not necessary for generating the main arc. On the other hand, in the present invention, for example, when the first and second welding power units 214 and 215 have high frequency devices, a pilot arc is generated by the high-frequency device constituting the first welding power unit, then by the high-frequency devices constituting the first and second welding power units (two high-frequency devices), the pilot arc as the main arc is more reliably shifted from the electrode to the base material (transferred type).

That is, in the present invention, by using a high-frequency device provided in the first and second welding power units 214 and 215, the pilot arc can be shifted smoothly to the main arc.

The first welding power unit 214 is not a generally conventional plasma power unit (specifically, the plasma arc power unit, a pilot arc power unit, and the power unit consisting of a high-frequency device). The first welding power unit 214 is an inexpensive welding power unit used in a generic TIG welding system.

The first welding power unit 214 may include, for example, a high-frequency devices for arc formation, a high-voltage device for arc formation, or a welding power unit which can adjust DC output current, initial current, crater current, gas pre-flow time, gas after-time, current-up slope time, current downslope time, pulse frequency, and a pulse width.

The specification of the first welding power unit 214 may use, for example, DC output current of 4 A to 500 A, initial current of 10 A to 500 A, crater current of 10 A to 500 A, gas pre-flow time of 0 to 30 seconds, gas after time of 0 seconds to 30 seconds, up slope time of 0 to 10 seconds, current output of 0 to 10 seconds, down slope time of 0 to 10 seconds, current output of 0 to 10 seconds, pulse frequency of 0.1 Hz to 500 Hz, pulse width of 5% to 95%.

As the first welding power unit 214, for example, a welding power unit having AC-DC dual-use, in which both of AC and DC can be used. In this case, only a direct current function of the welding power unit having AC-DC dual-use is used.

The first welding power unit 214 has a positive terminal 214A and a negative terminal 214B. The positve terminal 214A is connected to one end of a wire 216. The positve terminal 214A is electrically connected with the insert chip 222 via the wire 216.

The negative terminal 214B is connected to one end of a wire 217. The negative terminal 214B is electrically connected to the electrode 221 via the wire 217.

The first welding power unit 214 having the above-mentioned structure functions as a welding power unit performing non-transferred plasma welding.

The second welding power unit 215 is not a generally conventional plasma power unit (specifically, the plasma arc power unit, a pilot arc power unit, and the power unit consisting of a high-frequency device), the first welding power unit 214 is an inexpensive welding power unit used in a generic TIG welding system.

The second welding power unit 215 may use the same power unit as the first welding power unit 214 (for example, a high-frequency devices for arc formation, a high-voltage device for arc formation, or a welding power unit which can adjust DC output current, initial current, crater current, gas pre-flow time, gas after-time, current-up slope time, current downslope time, pulse frequency, and a pulse width) In addition, the specifications of thereof are the same range as those above-mentioned.

Incidentally, as the second welding power unit 215, for example, a welding power unit having AC-DC dual-use in which both of AC and DC can be used. In this case, when stainless steel or iron is used as the material of the workpiece 211, only a direct current function of the welding power unit having AC-DC dual-use is used. In addition, when aluminum or copper alloy is welded, only a alternating current function is used.

The second welding power unit 215 has a positive terminal 215A and a negative terminal 215B. The positve terminal 215A is connected to one end of the wire 218. The positve terminal 215A is electrically connected with the workpiece 211 via a wire 218.

The negative terminal 215B is connected to one end of the wire 219. The negative terminal 215B is electrically connected to the electrode 221 via the wire 219.

The second welding power unit 215 having the above-mentioned structure functions as a welding power unit performing non-transferred plasma welding.

The above mentioned power unit 213 (the welding power unit consisting of the first and second welding power units 214 and 215), for example, can use a power unit with about ¹⁄₁₀ to ⅓ of the price of a typical conventional plasma power unit. Thus, it is possible to reduce the cost of the welding system 210.

Thus, since the lower cost power unit 213 than the generally conventional plasma power unit (specifically, a plasma arc power unit, a pilot arc power unit, and the power unit composed of a high-frequency device) is used, a synergistic effect of a plasma jet arc generated by a current supplied from the first welding power unit 214 and a plasma arc generated by a current supplied from the second welding power unit 215 make it possible to improve penetration of the workpiece 211 than those obtained by conventional plasma system. Accordingly, the same or deeper penetration depth with respect to those of conventional plasma system can be obtained, and in addition, it is possible to increase the welding speed.

Since the welding system 210 of the embodiment includes the first welding power unit 214 and the second welding power unit 215, the base material welding is carried out by using the combined electrical energies supplied from the first and second welding power units 214 and 215.

Further, according to the base material and the welding conditions for welding, it may need supply more welding current, however, in the second embodiment of the invention, even in this case, it is enough to use any combination of general-purpose TIG welding power units.

Moreover, it is possible to stably maintain the main arc, by constantly using the high-frequency device that is standardly installed in a general-purpose TIG welding power unit.

That is, in the second embodiment of the present invention, by using the synergistic effect of non-transferred type plasma welding and transferred type plasma welding, it is possible to obtain necessary penetration depth. Further, by setting a higher welding current, a weld penetration depth deeper than the conventional plasma welding can be obtained, and high-speed welding can be realized.

On the other hand, in the conventional plasma arc welding system, only the electrical energy from the main power unit is used for welding the base metal; therefore, according to the base welding metal and the welding conditions, it is necessary to supply more welding current, and as a result, it is required to add a welding power unit.

The welding system of the present embodiment includes a plasma welding torch 212 and a power unit 213 which includes the first welding power unit 214 and the second welding power unit 215, wherein first welding power unit 214 is the welding power unit for TIG welding system, and the positive terminal 214A is electrically connected to the insert chip 222 and the negative terminal 214B is electrically connected to the electrodes 221; and the second welding power unit 215 is the welding power unit for TIG welding system, and the positive terminal 215A is electrically connected to the workpiece 211 and the negative terminal 215B is electrically connected to the electrode 221.

Thus, since the lower cost power unit 213 than the generally conventional plasma power unit is used, a synergistic effect of a plasma j et arc generated by a current supplied from the first welding power unit 214 and a plasma arc generated by a current supplied from the second welding power unit 215 make it possible to improve penetration depth of the workpiece 211 than those obtained by conventional plasma system.

That is, not only the initial investment in welding system 210 is suppressed, but also it is possible to obtain a penetration depth at least equivalent to the conventional plasma welding system.

Incidentally, the welding system 210 having the above-mentioned structure can be used in the non-keyhole welding or keyhole welding.

Then, referring to FIG. 15, a first plasma welding method will be described using the welding system 210 of this embodiment.

The first plasma welding method of the embodiment includes a plasma jet arc generation step of generating a non-transferred type plasma jet arc between the electrode 221 and the insert chip 222; and a welding step of welding the workpiece 211 by a non-transferred type plasma jet arc genereated between the workpiece 211 and the electrode 221, wherein in the plasma jet arc generation step, a current is supplied from the first welding power unit 214 which is a welding power unit for TIG welding system, the positive terminal 14A is electrically connected to the insert chip 222 of th plasma welding torch 212 and the negative terminal 214B is electrically connected to the electrode 221 of the plasma welding torch 212; and in the welding step, a current is supplied from the second welding power unit 215 which is a welding power unit for TIG welding system, the positive terminal 15A is electrically connected to the workpiece 211 and the negative terminal 215B is electrically connected to the electrode 221.

In the plasma jet arc generation step, first, a center gas is supplied to the passage for supplying center gas 223. The center gas may use the above-mentioned gas.

As a flow rate of the center gas, it is possible to select appropriately value according to the object, and for example, it may be set within a range of 0.1 to 5 L/min.

At this time, the outer gas may or may not be supplied to the outer gas supply passage 225.

Then, using the first welding power unit 214, by supplying the current between the electrode 221 and the insert chip 222, a plasma jet arc of non-transferred type is generated below the distal end portion 221A of the electrode 221.

At this time, the magnitude of the current supplied by the first welding power unit 214 between the electrode 221 and the insert chip 222 may be, for example, suitably selected within a range of 4 A to 500 A according to the performance of the welding power unit.

When the magnitude of the current supplied by the first welding power unit 214 between the electrode 221 and the insert chip 222 is less than 4 A, the pilot arc may become unstable. On the other hand, when the magnitude of the current supplied by the first welding power unit 214 between the insert chip 222 and the electrode 221 is greater than 500 A, the inexpensive TIG welding power unit is not enough, and as a result, the installation cost increases.

Thus, when the magnitude of the current supplied by the first welding power unit 214 between the electrode 221 and the insert chip 222 is in the range of from 4 A to 500 A, it is possible to suppress the installation cost of the welding power unit.

It is preferable to set the current supplied by the first welding power unit 214, for example, in the range of from 20 A to 500 A.

In this way, when the current supplied by first welding power unit 214 is in the range of from 20 A to 500 A, not only the obtained the plasma jet arc is stabilized, but also it is possible to obtain deeper penetration.

In the above welding process, when the outer gas has not been supplied in the outer gas supply passage 225 in the plasma jet arc generating step, the outer gas is supplied in the outer gas supply passage 225.

In the plasma jet arc generating step, when the outer gas has been supplied in the outer gas supply passage 225, the supply of the outer gas continues. The outer gas has a function of blocking the molten portion from the atmosphere.

Next, in the welding step, an example in which a workpiece 211 is welded with the plasma jet arc and the plasma arc is described below.

In this case, in a state that generation of a plasma jet arc continues by maintaining the supply of the outer gas (current supply from the first welding power unit 214 is continued), the welding of the workpiece 211 is performed by using a plasma jet arc and plasma arc generated by the current which is supplied by the second welding power unit 215 between the workpiece 211 and the electrode 221.

At this time, the current supplied by the second welding power unit 215 may be smaller or greater than the current supplied by the first welding power unit 214.

In the welding step, the current supplied by the second welding power unit 215, for example, may be appropriately selected within a range of from 4 A to 500 A.

Incidentally, in the welding step, it is also possible to weld a workpiece 211 only using the plasma arc.

In this case, while the supply of the outer gas is maintained, the second welding power unit 215 supplies the current between the electrode 221 and the workpiece 211, and then, welding of the workpiece 211 is performed only by using the plasma arc in state that the generation of the plasma jet arc is stopped (supply current of the first welding power unit 214 is stoped).

In this welding step, the current supplied by the second welding power unit 215, for example, can be appropriately selected within a range of from 4 A to 500 A.

In the case that the material of the workpiece 211 is aluminum alloy or Cu alloy, since the cleaning processing is required, the current supplied by the second welding power unit 215 may use AC arc waveform.

Here the term "cleaning process" refers to a process of removing oxide film on the surface of the base material by positive ions collide. In the cleaning process, when the electrode side is a positive side, since the electrode is consumed, it is impossible to use a direct-current power unit (positive electrode) as the second welding power unit 215. Therefore, the current supplied by the second welding power unit 215 may use AC arc waveform, and as a result, the wear of the electrode is suppressed, and it is possible to remove the oxide film.

In addition, the welding system 210 may not use the second welding power unit 215 and use only the first welding power unit 214 for pre-heating the base material which requires preheating. After reaching temperature which is the object of pre-heating, the second welding power unit 215 is used to transfer to the main arc. In addition, the other welding, brazing, soldering and thermal spraying may be carried out, and it may be used as the other heat sources (e.g., many other heat sources, such as heat source of furnace, heat source of post-thermal processing, and heating process of glass source-after heat treatment).

A plasma torch using a general-purpose TIG torch (e.g., a torch disclosed in Japanese Patent Application No. 2014-056528) may also be used.

The welding system 210 only uses the second welding power unit 215, and the plasma welding torch 212 may be used as a TIG welding torch by increasing diameter of the insert chip hole 222B of the plasma welding torch 212 to become larger than that of the electrode 221, and by protruding the electrode 221 from the tip of the insert chip 222B. In addition, instead of the plasma welding torch 212, it may be used as a TIG welding torch.

According to the first plasma welding method of this embodiment, since the method includes the plasma jet arc generation step described above and the welding step for welding the workpiece 211, by using an inexpensive power unit 213 instead of an expensive power unit of a conventional plasma welding system and by using the synergistic effect of the plasma jet arc generated by the current supplied from the first welding power unit 214 and the plasma arc generated by the current supplied from the second welding power unit 215, it is possible to increase the penetration depth of the workpiece 211. That is, it is possible to use the current supplied from the first welding power unit 214 (electric energy) to stabilize the transfer of the main arc.

Therefore, after suppressing the initial investments in welding system 210, it is possible to obtain penetration depth at least equivalent to the conventional plasma welding system.

Incidentally, the DC power unit for the pilot arc disclosed in Patent Document 2 supplies a current for generating arc, however, since the current is a generally low, it is impossible to contribute to the stable transfer of the main arc as the first power weld unit 214 of this embodiment.

Next, referring to FIG. 15, a second plasma welding method will be described using the welding system 210 of this embodiment.

The second plasma welding method of the embodiment includes a plasma jet arc generation step of generating a non-transferred type plasma jet arc between the electrode 221 and the insert chip 222; and a welding step of welding the workpiece 211 by a non-transferred type plasma jet arc genereated between the workpiece 211 and the electrode 221, wherein in the plasma jet arc generation step, a current is supplied from the first welding power unit 214 which is a welding power unit for TIG welding system, the positive terminal 214A is electrically connected to the insert chip 222 of the plasma welding torch 212 and the negative terminal 214B is electrically connected to the electrode 221 of the plasma welding torch 212; and in the welding step, a current is supplied from the second welding power unit 215 which is a welding power unit for TIG welding system, the positive terminal 215A is electrically connected to the workpiece 211 and the negative terminal 215B is electrically connected to the electrode 221, and a high-frequency start method by using a high-frequency device constituting the second welding power unit 215 is used, or a high-voltage start method by using a high voltage devices constituting the second welding power unit 215 in place of the high-frequency device is used.

In the second embodiment of the present invention, the term "high-frequency start method" refers to a start method using a high frequency when arc start, the term "high-voltage start method" refers to a start method using a high voltage when arc starts.

The second plasma welding method of the present embodiment may be carried out in the similar method as the first plasma welding method above-mentioned and it is possible to obtain similar effect to that of the first plasma welding methods, except that at the welding step, the workpiece 211 is welded by a transferred type plasma jet arc genereated between the workpiece 211 and the electrode 221, by using the high-frequency start method using high-frequency devices constituting the second welding power unit 215, or by using a high-voltage start method using the high voltage devices constituting the second welding power unit 215 in place of the high-frequency device.

In addition, the second plasma welding method of the present embodiment is different from the first plasma welding method described above in that even with a small value of current supplied from the first welding power unit 214 (e.g., be about 5 A), by using high-frequency device or high-voltage device of the second welding power unit 215, it is possible to obtain a stable arc transfer.

In the second plasma welding method, the high-frequency device or the high-voltage device constituting the second welding power unit 215 is used to perform a stable main arc transfer, and in the first plasma welding method, the current (electric energy) supplied from the first welding power unit 214 is used to perform the stable main arc transfer.

EXAMPLE

The effect of the present invention is described by using examples. The present invention is not limited to the following examples. Modification can be carried out appropriately within a scope not changing the gist thereof Example 1

Figure 9:
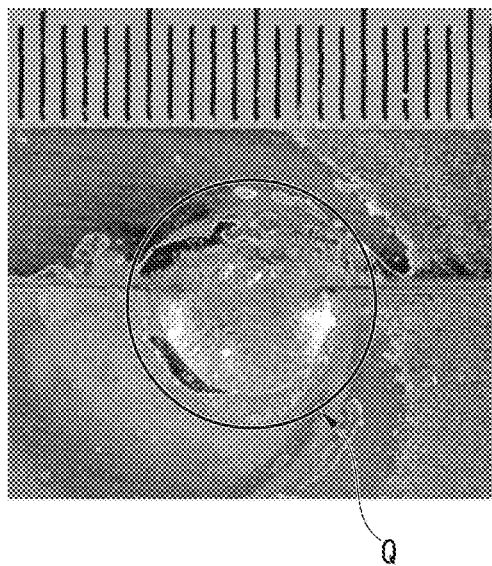
FIG. 9 is a photograph showing the bead appearance of the lap joints of after welding in Example 1.

In Example 1, welding is actually performed using the plasma arc torch 1. The welding conditions are listed below.
The material of the workpiece: Cold rolled steel plate (SPCC), thickness 1.6 mm, 2 sheets
Welding Type: lap joint
Plasma gas: mixed gas of 93% Ar gas and 7% $H_2$ gas, flow rate of 10 L/min
Non-consumable electrode: tungsten electrode rod, diameter 4 mm
Power supply nozzle: inner diameter 5 mm
Brazing filler metal: phosphorus copper brazing filler
Current: 180 A
And a photograph after welding was shown in FIG. 9.
As shown in the enclosed part Q in FIG. 9, the welding part had a beautiful finish with no welding defect.

Example 2-1

Figure 10:
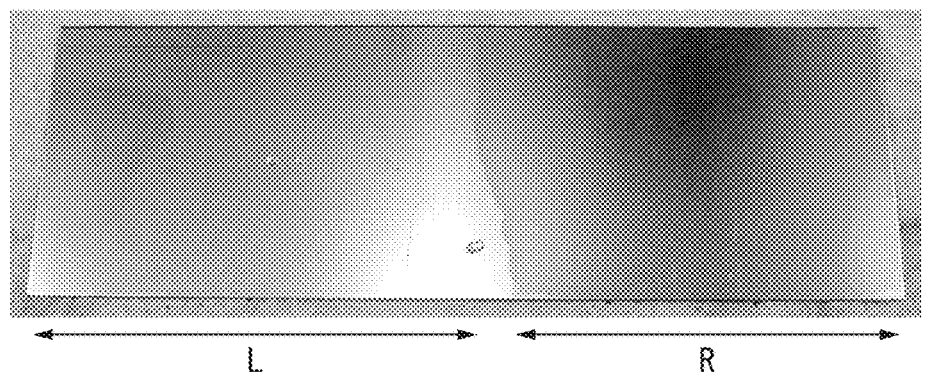
FIG. 10 is a photograph showing the surface of the steel plate with and without a plasma treatment in Example 2-1.

In Example 2-1, actually by using the plasma arc torch 1, a plasma treatment to the surface of the steel sheet (surface modification treatment) was conducted. The process conditions were listed below.
The material of the steel plate: stainless steel (SUS304), thickness 0.7 mm
Plasma gas: 100% Ar gas, flow rate of 5 L/min
Power supply nozzle: inner diameter 5 mm
Current: 100 A
And a photograph after plasma treatment was shown in FIG. 10. Incidentally, the left side (L) of FIG. 10 is a case without the plasma treatment, and the right side (R) of FIG. 10 is a case with a plasma treatment.
As shown in FIG. 10, the wettability on the surface of the steel sheet is improved by the plasma treatment.

Example 2-2

Figure 11:
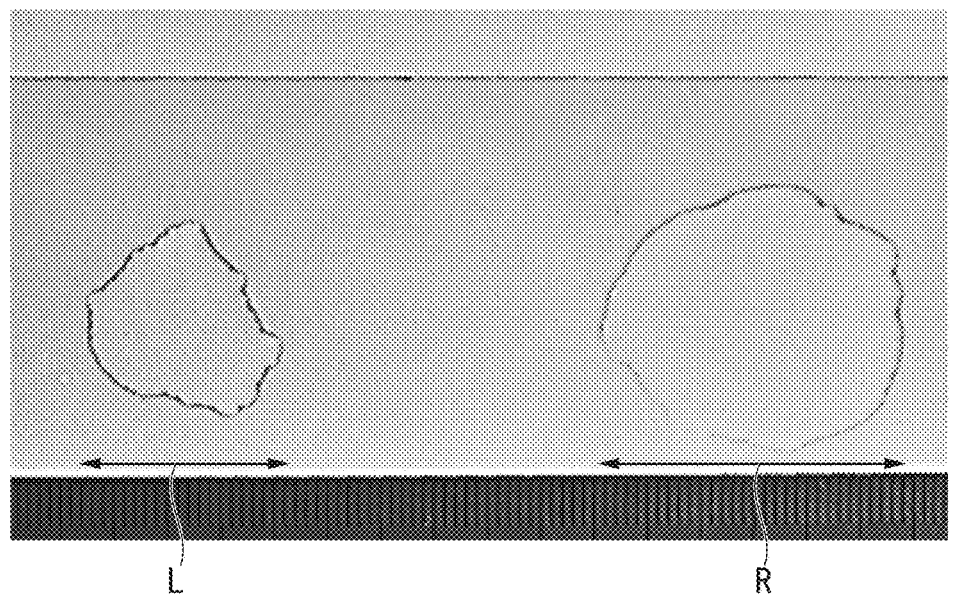
FIG. 11 is a photograph showing the surface of the glass plate with and without a plasma treatment in Example 2-2.

In Example 2-2, actually by using the plasma arc torch 1, a plasma surface treatment (surface modification treatment) of the glass plate was performed. The processing conditions were listed below.
The material of the glass plate: float glass, thickness 2 mm
Plasma gas: 100% Ar gas, flow rate of 5 L/min
Power supply nozzle: inner diameter 5 mm
Current: 50 A
And a photograph after the plasma treatment was shown in FIG. 11. Incidentally, the left side (L) of FIG. 11 is a case without the plasma treatment, and the right side (R) of FIG. 11 is a case with a plasma treatment.
As shown in FIG. 11, wettability at the surface of the glass plate was improved by the plasma treatment.

Example 3-1

Figure 12A:
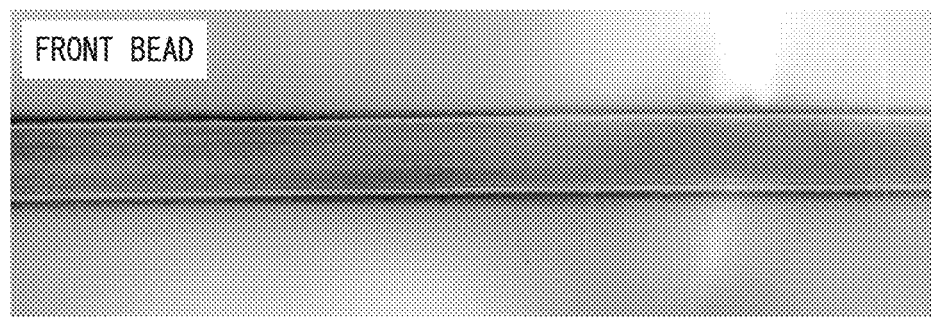
FIG. 12A is a photograph showing the welding results with a welded plate of SUS304 under the conditions of Example 3-1.
Figure 12B:
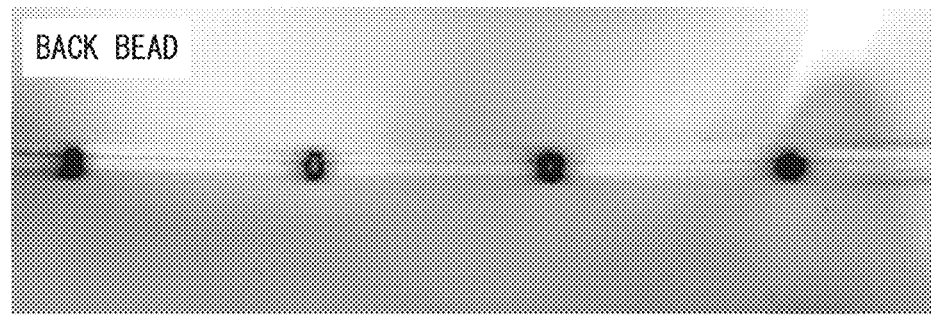
FIG. 12B is a photograph showing the welding results obtained by welding a plate of SUS304 under the conditions of Example 3-1.

Example 3-1 is an example by using a device attached with the plasma adapter of the present invention shown in FIG. 5 of the first embodiment of the present invention. A surface bead and back bead of welding results were shown in FIGS. 12A and 12B. Compared to conventional welding, good bead appearances were obtained. Further, the similar results were obtained by mounting the plasma adapter of the first embodiment of the present invention in the system, as shown in FIG. 15, of the second embodiment of the present invention (two TIG welding machine). The processing conditions were as follows.
The material of the steel plate: stainless steel (SUS304), thickness 1mm
Pilot gas (center gas): 100% Ar gas, flow rate of 1.5 L/min
Shielding gas (outer gas): mixed gas of 93% Ar gas and 7% $H_2$ gas, flow rate of 7 L/min
Electrode diameter: Φ2.4
Restraint nozzle inner diameter: Φ2
Welding speed: 60 cm/min
Welding current: 30 A Example 3-2

Figure 13A:
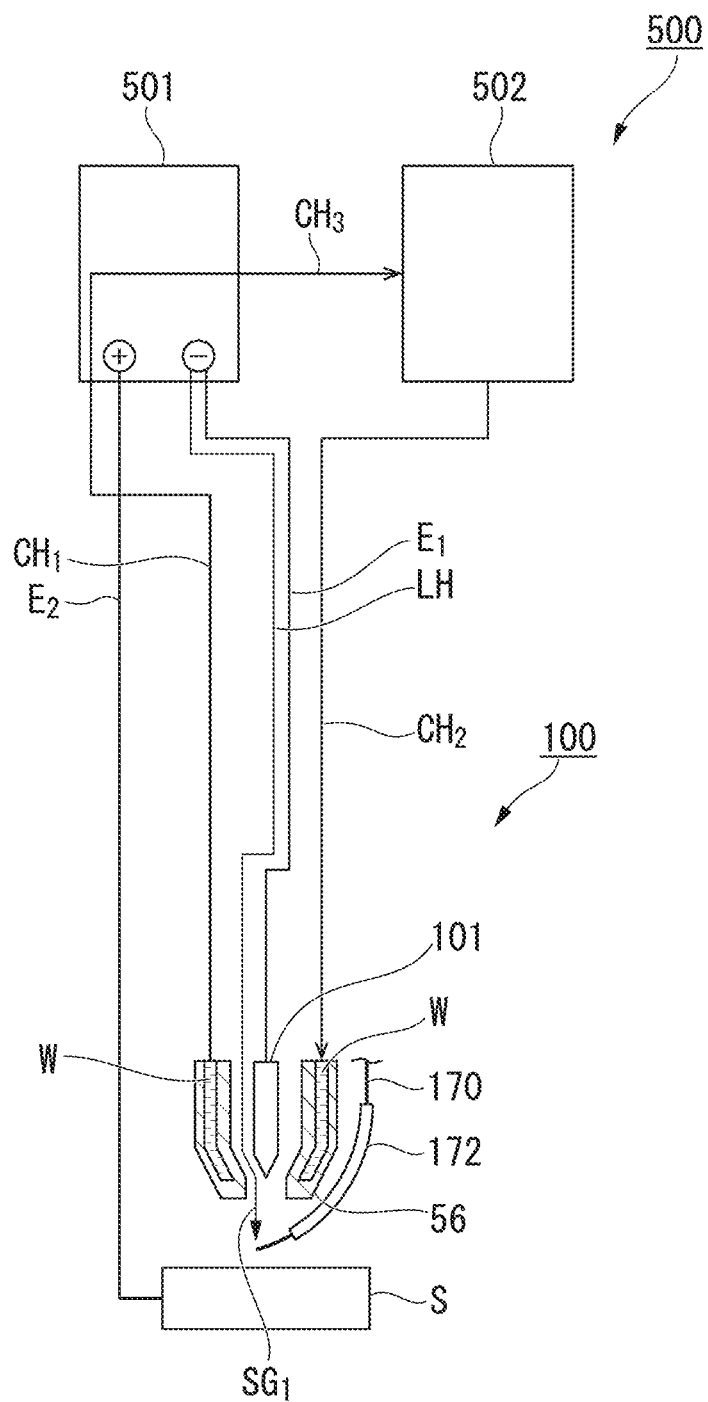
FIG. 13A is a schematic diagram showing a plasma spray nozzle used in Example 3-2.
Figure 13B:
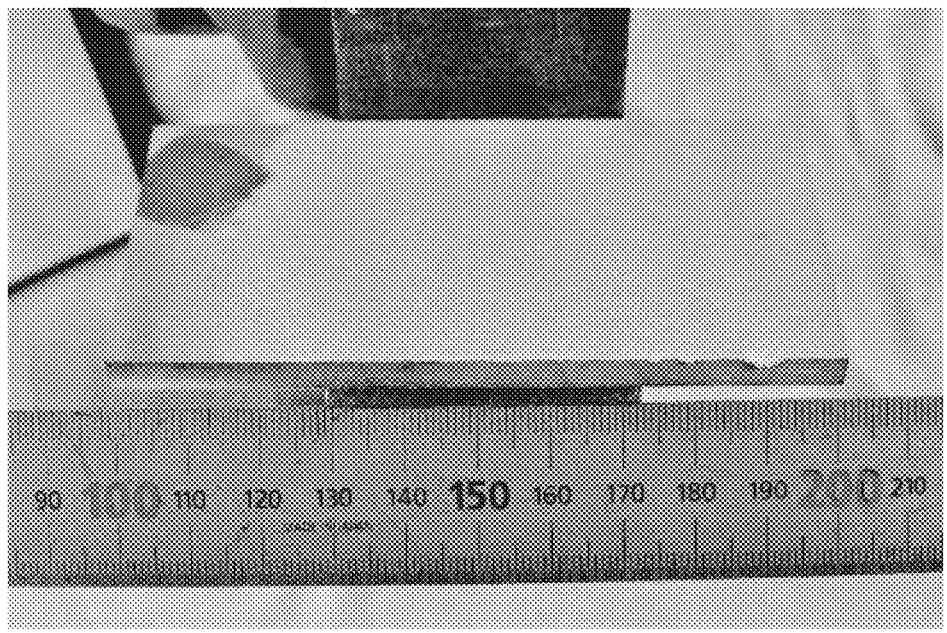
FIG. 13B is a photograph showing the appearance of the base material after spraying in Example 3-2.
Figure 13C:
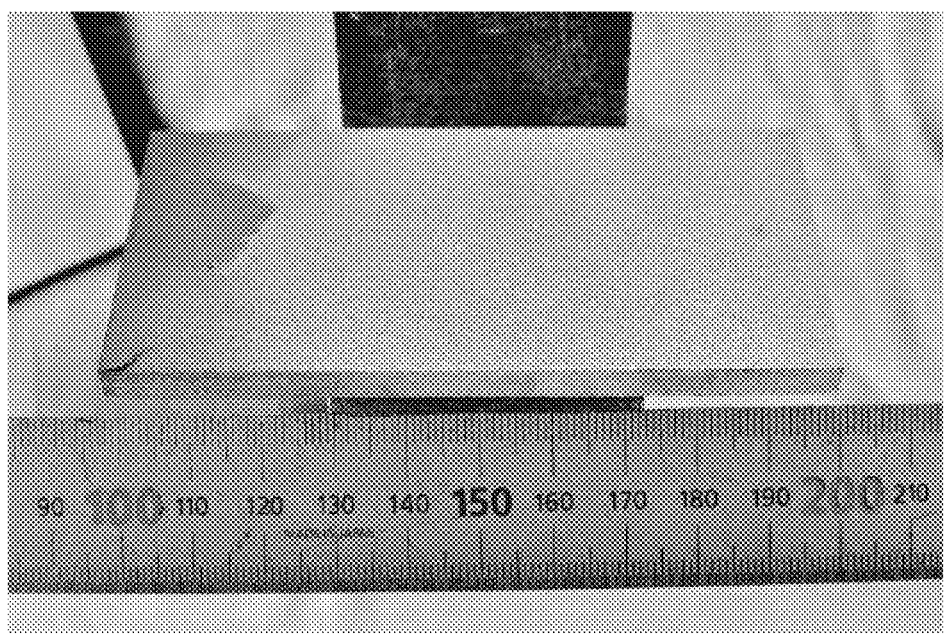
FIG. 13C is a photograph showing the appearance of the base material the after spraying in Example 3-2.
Figure 13D:
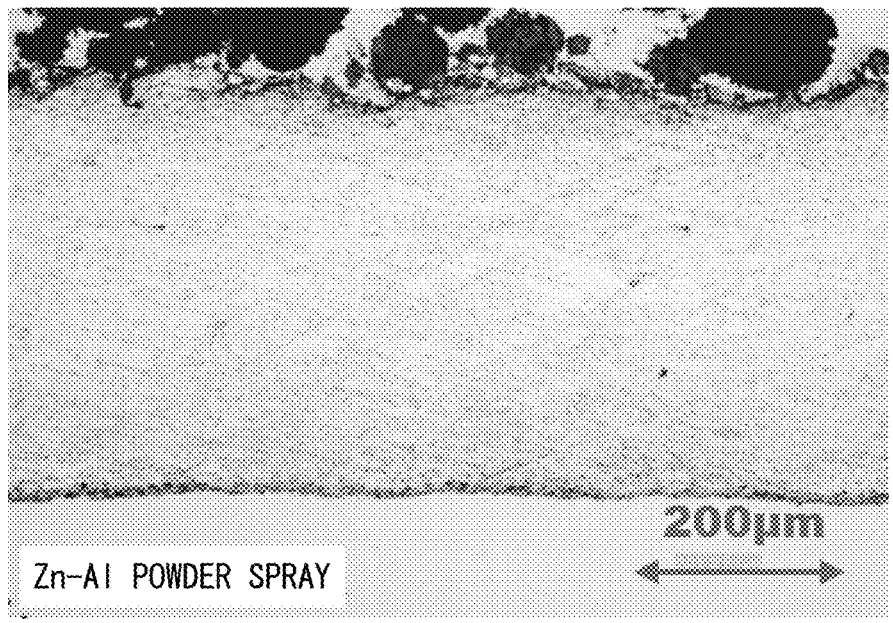
FIG. 13D is a microscopic photograph showing cross-section of the base material after spraying in Example 3-2.
Figure 13E:
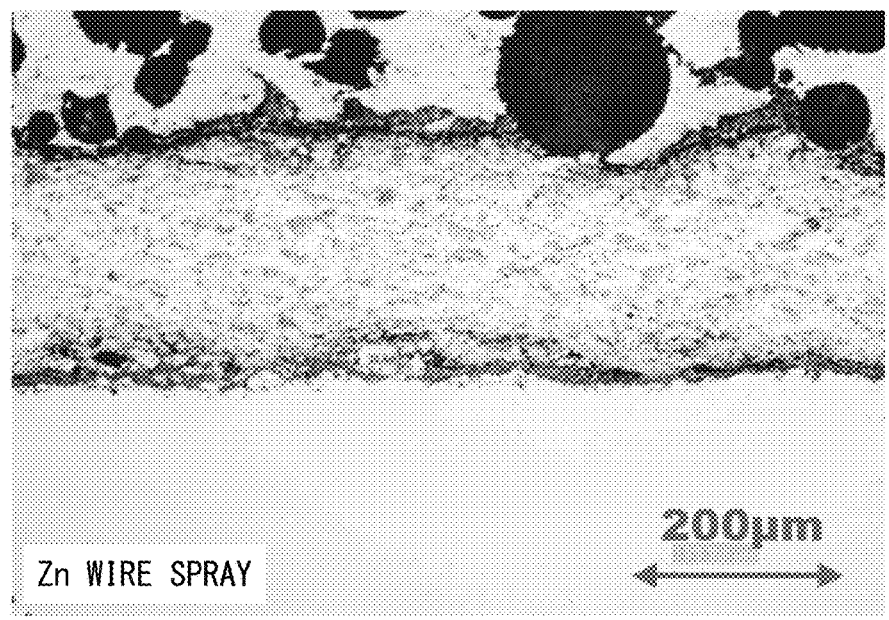
FIG. 13E is a microscopic photograph showing cross-section of the base material after spraying in Example 3-2.

Example 3-2 is a plasma spraying example. It was an example that was carried out in the absence of shielding gas (outer nozzle) as shown in FIG. 5.
Zn-2% Al powder and Zn wire was thermal-sprayed to a blasting material as base material. FIG. 13A shows a plasma spray nozzle used in this Example. FIGS. 13B, 13C show the appearances of the base materials after spraying. FIGS. 13D, 13E shows cross-section of spraying. The cross-sections of the base materials after spraying were confirmed by a microscope, and it was confirmed that it was well spraying. Zinc aluminum plasma spraying conditions were listed below.
The current-voltage: 300 A 44V (13.2 kW)
Plasma gas: mixed gas of 93% Ar gas and 7% $H_2$ gas, flow rate of 20 L/min
Thermal spraying material: (1) Zn-2% Al powder, grain size: 53 μm
(2) Zn wire, φ1.3 mm
Spraying distance: about 100 mm
Base material: blasting material Experimental Example of the Second Embodiment of the Present Invention In the example, a welding system 210 shown in FIG. 15 was used and a plate made of SUS 304 with thickness of 3 mm was used as the workpiece 211. The workpiece 211 was welded by ejecting arc and moving the plasma welding torch 212 in a predetermined direction.

Specifically, in the example, the first welding power unit 214 supplied current of 20 A to generate plasma jet arc. Then, the second welding power unit 215 supplied current of 100 A, and after one second, the supply of current from the first welding power unit 214 was stopped, and the second welding power unit ejecting a plasma arc to the plate material made of SUS304, and welding process of the workpiece 211 was performed. However, there were cases in which the plasma arc can not be maintained during welding.

At this time, the welding system 210 had the following configuration.

The first welding power unit 214 which constituted the power unit 213 used YC-300BP4 (model number) which was a welding power unit for Panasonic TIG. As the second welding power unit 215 which constituted the power unit 213 used YC-500BP4 (model number) which was a welding power unit for Panasonic TIG.

When the power unit used in the conventional plasma welding system (a class having an output current range of 10 to 350 A) was 3500 thousand Japanese Yen, power unit 213 used in example (power unit including the first and second welding power units 214 and 215) was about half of the power unit for use in a plasma welding system.

The electrode 221 used a tungsten electrode having an outer diameter of 3.2 mm. The tip of the electrode 221 was placed at the position of 5 mm inside from the tip of the insert chip 222. The diameter of insert chip hole 222B of the insert chip 222 was set to 3.5 mm.

Further, the welding conditions are listed below.

The center gas supplied to the supplying center gas passage 223 had the flow rate of to 3 L/min, and used an argon gas containing 7% $H_2$. The outer gas flow rate was set to the 7 L/min, and used an argon gas containing 7% $H_2$.

Further, the moving velocity of the plasma welding torch 212 was set to 45 cm/min, and the distance of the welding process was set to 10 cm.

Thereafter, the state of the front surface and the back surface of the workpiece 211 after welding process were observed and captured by the camera. The photographs taken at this time were shown in FIG. 16.

Figure 16:
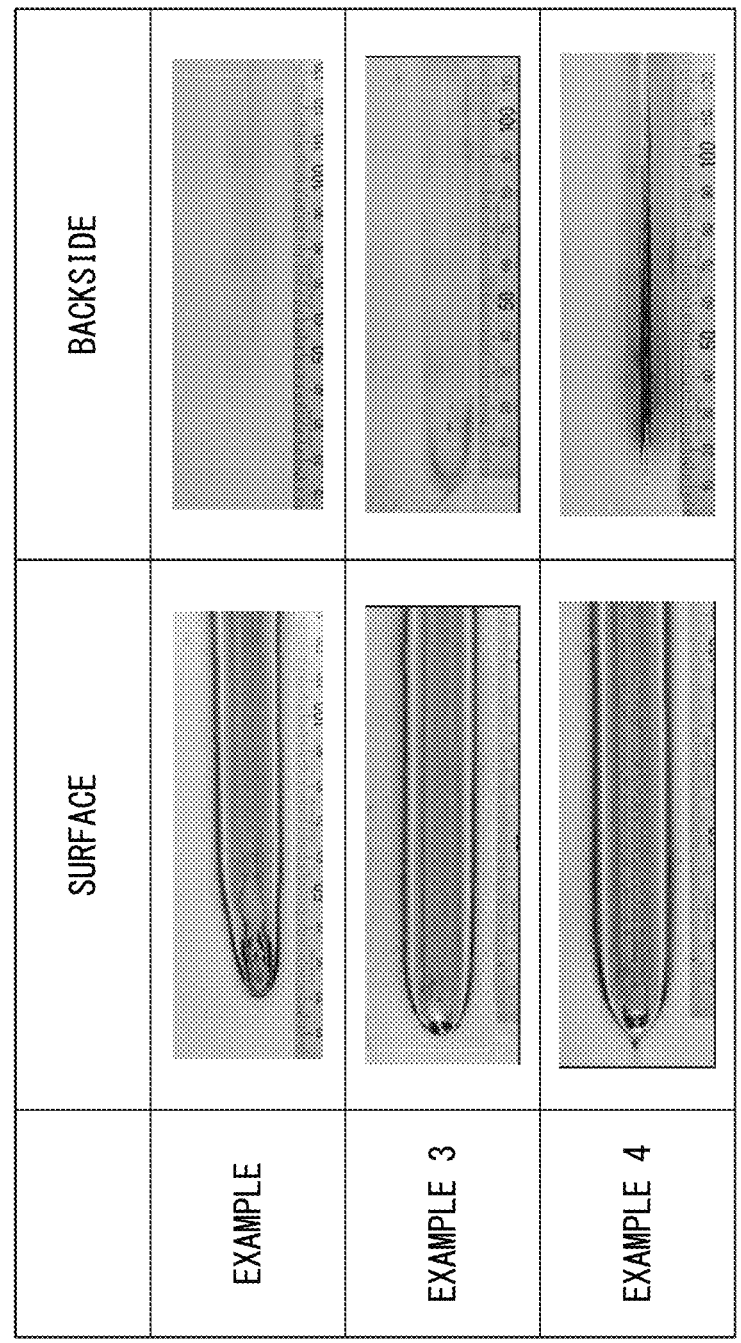
FIG. 16 is photographs showing the front and back surfaces of the plate after welding a plate of SUS304 under the conditions of Experimental Example, and Examples 3 and 4.

FIG. 16 shows photographs of the front surface and the back surface of the sheet material made of SUS304 after welding process under the conditions of the Experimental Example and Examples 3 and 4.

Table 1 shows the evaluation results of the penetration depth which were determined from the photographs shown in FIG. 16.

As shown in Table 1, the result that depth of penetration was quite deep, and the back bead was not only continuous but also clearly appeared was evaluated as "++". The result that the penetration depth was somewhat shallow, and the back bead was appeared in part was evaluated as "+". The results that it became difficult to maintain the arc during the welding was evaluated as "−".

TABLE 1

|  | Evaluation of Penetration Depth |
| --- | --- |
| Experimental Example | − |
| Example 3 | + |
| Example 4 | ++ |

Example 3

In Example 3, using the same device as the welding system 210 used in the Experimental Example described above, welding process was performed by supplying a current of 100 A by the second welding power unit 215 while the first welding power unit 214 kept supplying a current of 20 A. In Example 3, the same welding conditions as Experimental Example were used except that the power-on state of the first welding power unit 214 was continued After the welding process, the state of front surface and the back surface of the workpiece 211 after welding process were observed.

The results were shown in Table 1. In Example 3, a stable arc was obtained until end of the process.

Example 4

In Example 4, using the same device as the welding system 210 used in the Experimental Example described above except that the current supplied by the first welding power unit 214 was changed to 100 A, and the welding process was performed by supplying a current of 100 A by the second welding power unit 215 while the first welding power unit 214 kept supplying a current of 100 A. In Example 4, the same treatment as in Example 3 was performed except that the current supplied from the first welding power unit 214 was changed to 100 A.

After the welding process, the state of front surface and the back surface of the workpiece 211 after welding process were observed.

The results were shown in Table 1. In Example 4, it is similar as the case of Example 3, very good results of stable arc until the end and deeper penetration were obtained.

Summary of Results in Experimental Example, and Examples 3 and 4

In the case of using a generic TIG welding power unit, when the welding of the workpiece 211 was performed by supplying a current by the second welding power unit 215 while the welding current was not supplied from the first welding power unit 214, it was found that it was difficult to maintain the arc.

When the welding of the workpiece 211 was performed by supplying a current by the second welding power unit 215 while the welding current was supplied from the first welding power unit 214, it was possible to maintain the arc.

Then, it is confirmed that it was possible to obtain further deeper penetration by turning on the first and second welding power units 214 and 215 and increasing the currents supplied by the first and second welding power units 214 and 215.

INDUSTRIAL APPLICABILITY

The first embodiment of the present invention provides a non-transferred plasma arc system; a conversion adapter kit converting a TIG welding torch to a non-transferred plasma arc; and a non-transferred plasma arc torch including the conversion adapter kit in non-transferred plasma arc system which can use the non-transferred plasma arc inexpensively and readily.

The second embodiment of the present invention provides a plasma welding system and a plasma welding method, wherein the plasma welding system can obtain a deep welding penetration after suppressing the initial investment in the welding system.

| Reference Signs List | | | |
|---|---|---|---|
| 1 | plasma arc torch | 50 | conversion adapter kit |
| 51, 51A | attachment | 52, 52A | body portion |
| 53 | fixing screws (fixing means) | 54 | water jacket (waterway) |
| 55a | entry-side connecting portion | 55b | exit side of connection portion |
| 56 | power supply nozzle | 57 | shield cap |
| 58 | insulating cap (insulating section) | 59 | connection portion |
| 60 | gas lens (rectifier) | 61 | fixed portion |
| 62 | movable portion | 63 | housing recess |
| 64a, 64b | guide screw | 65a, 65b | guide slit |
| 66 | compression coil spring | 100 | TIG welding torch |
| 101 | non-consumable electrode | 102 | collet |
| 103 | collet body | 104 | torch body |
| 105 | torch nozzle | 106 | front gasket |
| 107 | rear gasket | 108 | torch cap |
| 109 | handle | 110 | body bracket |
| 151 | electrode center correction ceramic | 153 | nozzle |
| 155 | insulator | 157 | attachment fixed ring |
| 159 | body insulation cover | 161 | cover |
| 170 | wire | 172 | wire guide |
| 500, 500A | plasma arc system | 501 | power unit (TIG power unit) |
| 502 | cooling device | 503 | switching device |
| PG | plasma gas | SG | shielding gas |
| PA | plasma arc | W | cooling water (coolant) |
| S | workpiece | $C_1$ | first feed cable |
| $C_2$ | second feed cable | CA | collective cable |
| $E_1, E_2$ | feed cable | LH | liner |
| GH | gas hose | $CH_1, CH_2, CH_3$ | cooling hose |
| 210 | welding system | 211 | workpiece, |
| 212 | plasma welding torch | 213 | power unit |
| 214 | first welding power unit | 214A, 215A | positve terminal |
| 214B, 215B | negative terminal | 215 | second welding power unit |
| 216-219 | wire | 221 | electrode |
| 221A | tip | 222 | insert chip |
| 222A | cooling water flow path | 222B | insert chip hole |
| 223 | supplying center gas passage | 224 | shield cap |
| 225 | outer gas supply passage | 231 | cooling water circulation portion |
| 232 | center gas supply source | 233 | center gas supply line |
| 235 | outer gas supply source | 236 | outer gas supply line |

The invention claimed is:

1. A non-transferred plasma arc system comprising a non-transferred plasma arc torch and a power unit for supplying power and gas to the non-transferred plasma arc, wherein the plasma arc torch comprises a non-consumable electrode and an insert chip, wherein the insert chip is provided as an anode for emitting a plasma arc to the workpiece while the insert chip is cooled by circulation of coolant, and the plasma arc torch comprises a portion which repurposes a TIG welding torch comprising the non-consumable electrode which generates an arc between a workpiece and the non-consumable electrode, and a torch nozzle which releases a shielding gas toward the molten pool of the workpiece caused by the arc, and an attachment which functions as the insert chip and is provided so as to be freely attachable and detachable to and from the TIG welding torch in a state that the attachment surrounds the periphery of the torch nozzle.

2. The non-transferred plasma arc system according to claim 1, wherein the plasma arc torch further comprises a shield cap which releases shielding gas from the outside of the plasma arc and is provided so as to be attached to the attachment in a insulating state and in a state surrounding the periphery of the attachment.

3. The non-transferred plasma arc system according to claim 1, wherein the attachment comprises a power supply nozzle surrounding the distal end of the torch nozzle, and the plasma arc torch switchs between two states by moving the non-consumable electrode in the axial direction, wherein one state is a state that the the tip of the non-consumable electrode is withdrawn inside from the distal end of the power supply nozzle and another state is a state that the tip of the non-consumable electrode protrudes outside the distal end of the power supply nozzle.

4. The non-transferred plasma arc system according to claim 1, wherein the attachment comprises a power supply nozzle which is movably supported in the axial direction in a state of surrounding the periphery of the distal end of the torch nozzle, and the plasma arc torch switchs between two states by moving the non-consumable electrode in the axial direction, wherein one state is a state that the the tip of the non-consumable electrode is withdrawn inside from the distal end of the power supply nozzle and another state is a state that the tip of the non-consumable electrode protrudes outside the distal end of the power supply nozzle.

5. The non-transferred plasma arc system according to claim 1,
wherein the power unit repurposes a power unit for TIG welding.

6. The non-transferred plasma arc system according to claim 1,
wherein the power unit comprises a switching device for switching the supply of the electric power according to the case of using the TIG welding torch or using the plasma arc torch.

7. The non-transferred plasma arc system according to claim 6,
wherein it is possible to weld by only using the plasma arc torch or to weld only by using the TIG welding torch.

8. The non-transferred plasma arc system according to claim 6,
wherein the power unit comprises at least two power units for plasma arc torch and a power unit for TIG welding torch.

9. The non-transferred plasma arc system according to claim 1,
further comprises a cooling device for circulating a coolant flowing through the attachment, wherein the cooling device is connected to the plasma arc torch.

10. A conversion adapter kit converting a TIG welding torch to a non-transferred plasma arc torch,
wherein the TIG welding torch comprises a non-consumable electrode which generates an arc between a workpiece and the non-consumable electrode, and a torch nozzle which releases a shielding gas toward the molten pool of the workpiece caused by the arc,
the non-transferred plasma arc torch comprises a non-consumable electrode as a cathode and an insert chip as an anode, wherein the insert chip is provided for emitting a plasma arc to the workpiece while the insert chip is cooled by circulation of coolant, and
the conversion adapter kit comprises an attachment which functions as the insert chip and is provided so as to be freely attachable and detachable to and from the TIG welding torch in a state that the attachment surrounds the periphery of the torch nozzle.

11. The conversion adapter kit according to claim 10,
further comprises a shield cap which releases shielding gas from the outside of the plasma arc and is provided so as to be attached to the attachment in a insulating state and in a state surrounding the periphery of the attachment.

12. The conversion adapter kit according to claim 10,
wherein the attachment comprises a power supply nozzle surrounding the distal end of the torch nozzle.

13. A non-transferred plasma arc torch, comprising a TIG welding torch and a conversion adapter kit according to claim 10,
wherein the TIG welding torch comprises a non-consumable electrode which generates an arc between a workpiece and it, and a torch nozzle which releases a shielding gas toward the molten pool of the workpiece caused by the arc.

14. The non-transferred plasma arc torch according to claim 13,
wherein the non-transferred plasma arc torch is used by connecting a TIG welding power unit.

* * * * *